(12) United States Patent
Xu et al.

(10) Patent No.: US 8,864,105 B2
(45) Date of Patent: Oct. 21, 2014

(54) BALL VALVE SEATS AND BALL VALVES DESIGNED WITH EQUILATERAL TRIANGLE SECTION METHODS

(76) Inventors: Changxiang Xu, Longwan (CN); Mao Yang Xu, Longwan (CN); Zhanji Chen, Longwan (CN)

( * ) Notice: Subject to any disclaimer, the term of this patent is extended or adjusted under 35 U.S.C. 154(b) by 471 days.

(21) Appl. No.: 13/126,495
(22) PCT Filed: Mar. 17, 2009
(86) PCT No.: PCT/CN2009/000283
§ 371 (c)(1),
(2), (4) Date: Jul. 18, 2011
(87) PCT Pub. No.: WO2010/048770
PCT Pub. Date: May 6, 2010

(65) Prior Publication Data
US 2011/0260089 A1 Oct. 27, 2011

(30) Foreign Application Priority Data
Oct. 28, 2008 (CN) .......................... 2008 1 0172828

(51) Int. Cl.
F16J 15/34 (2006.01)
F16K 5/06 (2006.01)
F16K 5/20 (2006.01)
(52) U.S. Cl.
CPC ............... F16K 5/0668 (2013.01); F16K 5/204 (2013.01)
USPC .......................................... 251/314; 277/529
(58) Field of Classification Search
USPC ................ 251/314, 315.01, 316, 317; 277/529–533
See application file for complete search history.

(56) References Cited

U.S. PATENT DOCUMENTS 293,057 A 2/1884 Miller
778,480 A * 12/1904 Stewart .......................... 194/253
(Continued)

FOREIGN PATENT DOCUMENTS

CN 2713240 Y 7/2005
CN 01920363 A 2/2007
(Continued)

OTHER PUBLICATIONS

ISO5208-1993, "Industrial Valves—Pressure Testing of Valves," dated Jan. 15, 1993, 8 pages.
(Continued)

Primary Examiner — Elizabeth Houston
Assistant Examiner — Daphne M Barry
(74) Attorney, Agent, or Firm — Goodwin Procter LLP

(57) ABSTRACT

It is inevitable for the tight closure of a ball valve to be disturbed by its ball's wedging action, and its ball seat is an upset impulse amplifier with an inherent disturbance resistance index or a sealing maintaining factor m. The ball valve seat designed with equilateral triangle section methods of the invention can positively ensure itself a resistance to ball-wedged disturbance from eccentric drive to make a ball valve realize its tight closure by the floated pressure of balls or seats onto each other and ensure that the ultimate rotational resistance to the ball only relates to the ultimate pressure from/on one seat. Because the seat of the prior art can not ensure balls or seats against each other a floated pressure sufficient to resist to the ball-wedged disturbance from eccentric drive, the tight closure of the ball valve has to be realized by either larger preclamping force or larger spring preload between seats and balls so as for the ultimate rotational resistance to balls to be from larger ball-clamping forces from two seats. Therefore, the ball valve in accordance with the invention is a real floating or mounted ball valve, whose operation torque can be at most half of that of a formal or false floating ball valve of the prior art.

1 Claim, 5 Drawing Sheets

(56) References Cited

U.S. PATENT DOCUMENTS

| | | | |
|---|---|---|---|
| 2,328,390 A * | 8/1943 | Nelson | 277/452 |
| 2,930,576 A | 3/1960 | Sanctuary | |
| 2,945,666 A | 7/1960 | Freeman et al. | |
| 2,963,263 A | 12/1960 | Sanctuary | |
| 3,164,362 A | 1/1965 | Lavigueur | |
| 3,235,272 A * | 2/1966 | Smith | 277/399 |
| 3,269,691 A | 8/1966 | Meima et al. | |
| 3,425,663 A * | 2/1969 | Priese | 251/180 |
| 3,488,033 A | 1/1970 | Priese | |
| 3,721,425 A | 3/1973 | Jones et al. | |
| 3,752,178 A | 8/1973 | Grove et al. | |
| 4,147,327 A | 4/1979 | Moran | |
| 4,235,418 A | 11/1980 | Natalizia | |
| 4,236,691 A | 12/1980 | Wright | |
| 4,262,688 A | 4/1981 | Bialkowski | |
| 4,318,420 A | 3/1982 | Calvert | |
| 4,385,747 A | 5/1983 | Renaud, Jr. et al. | |
| 4,410,165 A | 10/1983 | Koch et al. | |
| 4,457,491 A | 7/1984 | Dudman | |
| 4,502,663 A | 3/1985 | Huber | |
| 4,557,461 A | 12/1985 | Gomi et al. | |
| 4,601,308 A | 7/1986 | Stone et al. | |
| 4,658,847 A | 4/1987 | McCrone | |
| 4,815,700 A | 3/1989 | Mohrfeld | |
| 4,940,208 A | 7/1990 | Kemp | |
| 6,948,699 B1 | 9/2005 | Keiser | |
| 6,969,047 B2 | 11/2005 | Hotton et al. | |
| 7,032,880 B2 | 4/2006 | Scaramucci | |
| 7,243,900 B2 | 7/2007 | Wang | |
| 8,439,330 B2 * | 5/2013 | Xu et al. | 251/214 |
| 2003/0111631 A1 | 6/2003 | Gosling | |

FOREIGN PATENT DOCUMENTS

| | | | |
|---|---|---|---|
| CN | 1920363 | A | 2/2007 |
| CN | 1967164 | A | 5/2007 |
| CN | 01967164 | A | 5/2007 |
| CN | 101187430 | A | 5/2008 |
| CN | 101187430 | A | 5/2008 |
| EP | 0313717 | A1 | 5/1989 |
| EP | 313717 | A1 | 5/1989 |
| FR | 2527730 | A1 | 12/1983 |
| FR | 2527730 | A1 | 12/1983 |
| GB | 1401754 | A | 7/1975 |
| GB | 1401754 | A | 7/1975 |
| GB | 2023773 | A | 1/1980 |
| GB | 2023773 | A | 1/1980 |
| WO | 82/03898 | A1 | 11/1982 |
| WO | WO-823898 | A1 | 11/1982 |

OTHER PUBLICATIONS

ISO5208-2008, "Industrial Valves—Pressure Testing of Metallic Valves," dated Aug. 1, 2008, 20 pages.

MSS SP-72/1999, "Ball Valves with Flanged or Butt-Welding Ends for General Service," (1999), 14 pages.

ASME, "2007 ASME Boiler and Pressure Vessel Code," Division 1, Section VIII, dated Jul. 1, 2007, 25 pages.

International Search Report for PCT/CN2009/000283 dated Aug. 5, 2009, 8 pages.

International Search Report dated Aug. 6, 2009, issued by the State Intellectual Property Office of the Peoples Republic of China, in corresponding International Application No. PCT/CN2009/000283, with English translation (8 pages).

* cited by examiner

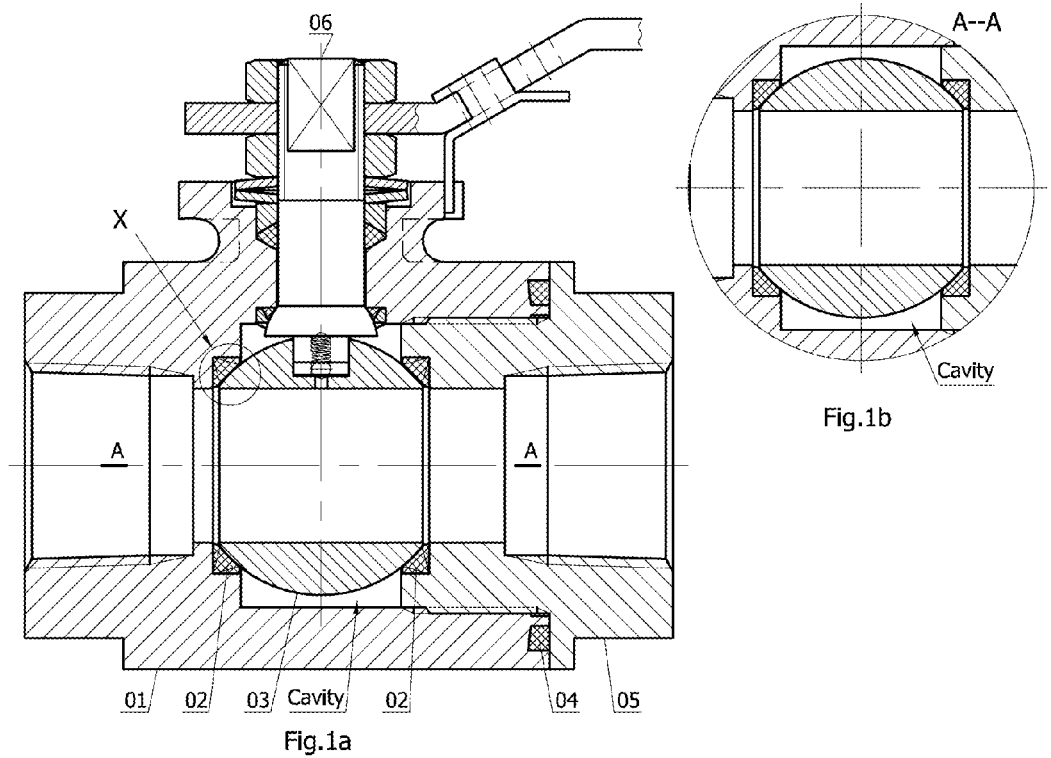
Fig.1a
Fig.1b
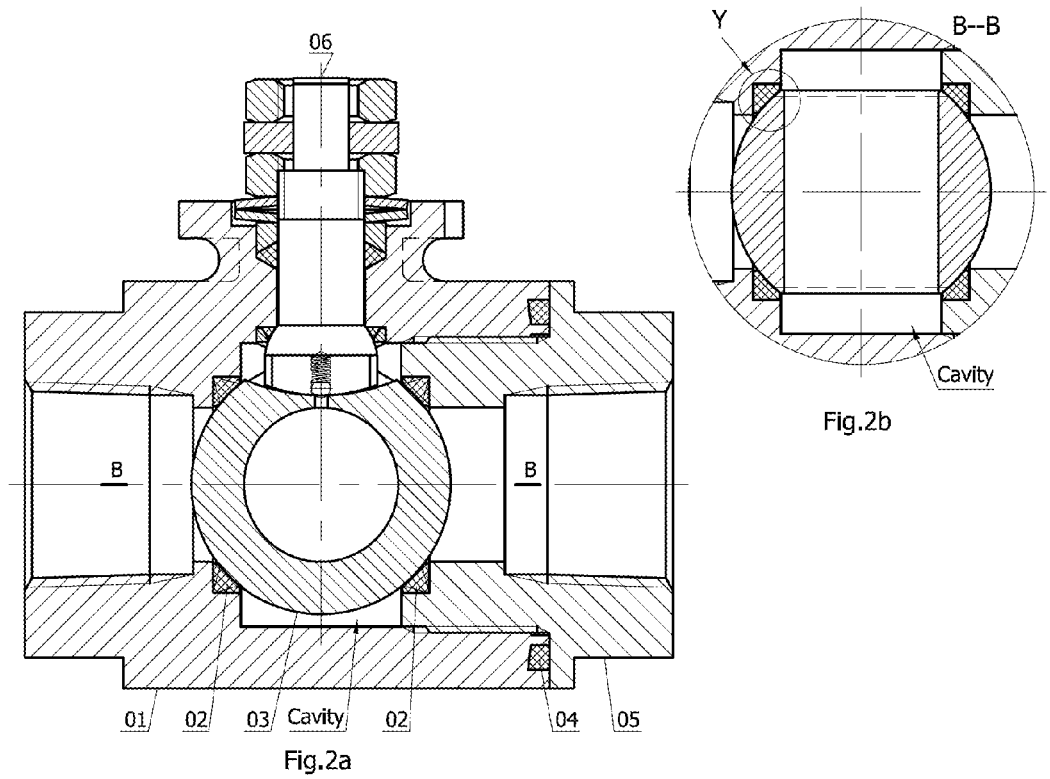
Fig.2a
Fig.2b

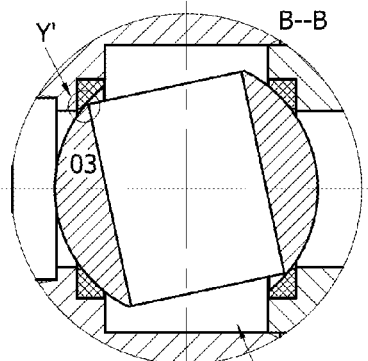
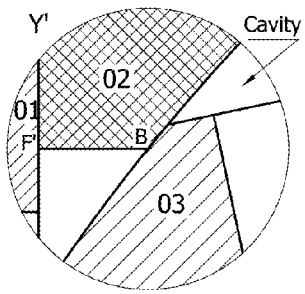
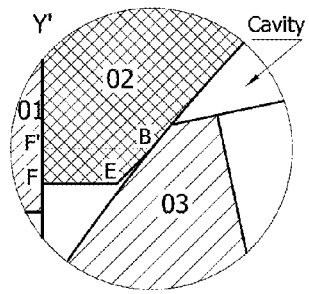
Fig.3    Fig.4a    Fig.4b
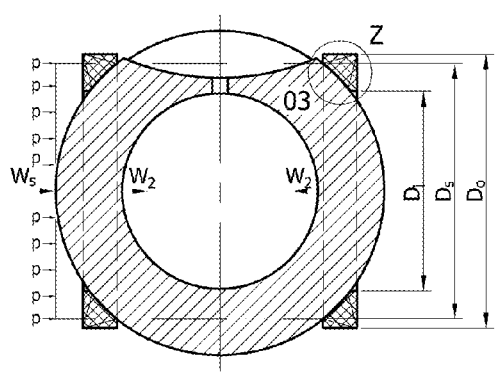
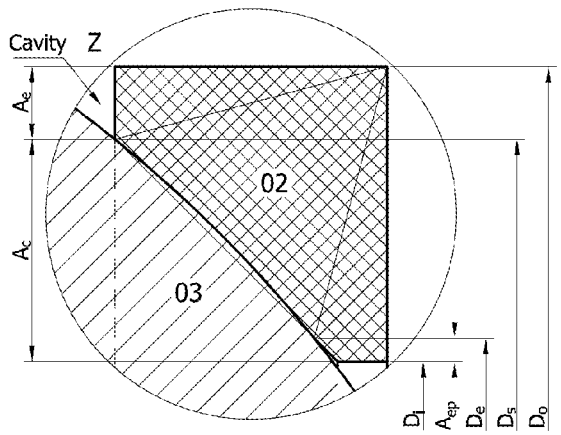
Fig.5a    Fig.5b
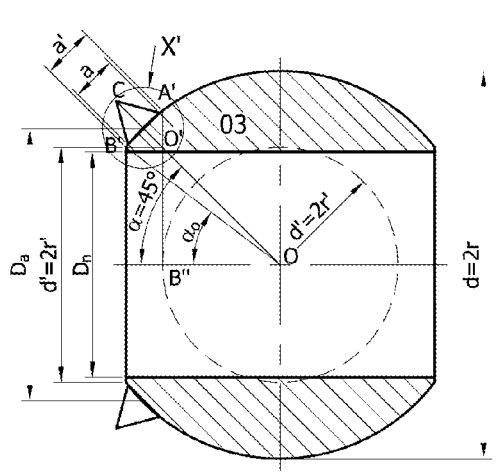
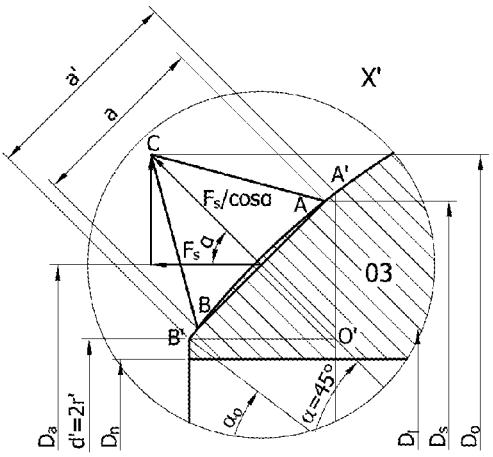
Fig.6a    Fig.6b

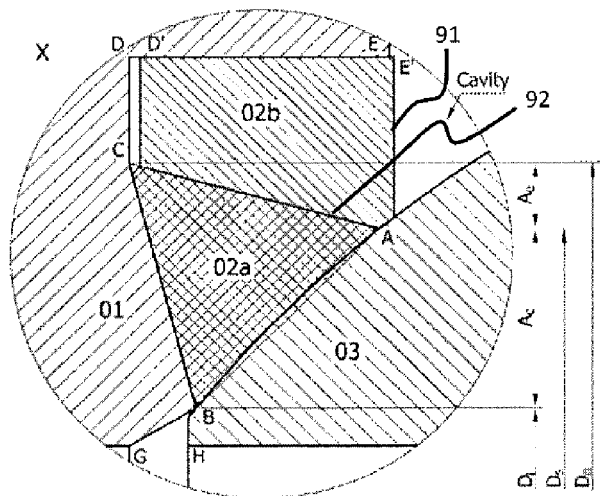
Fig.9a
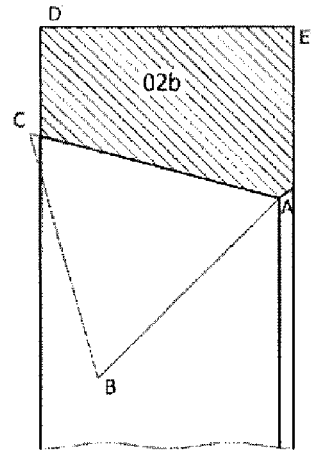
Fig.9d
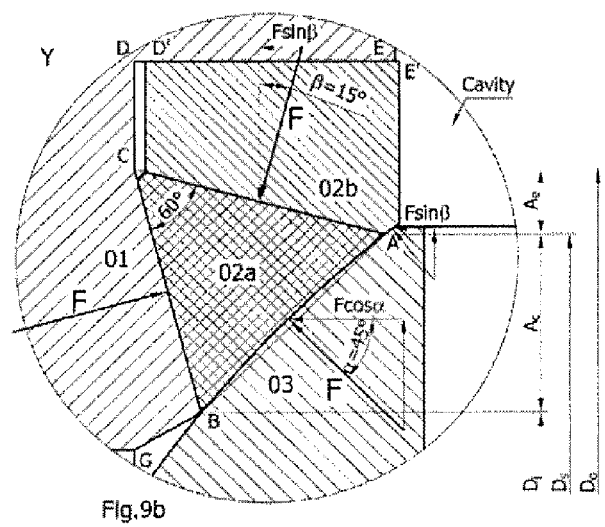
Fig.9b
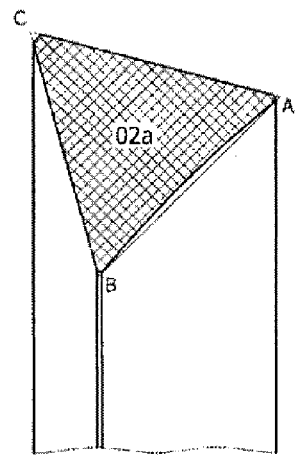
Fig.9c
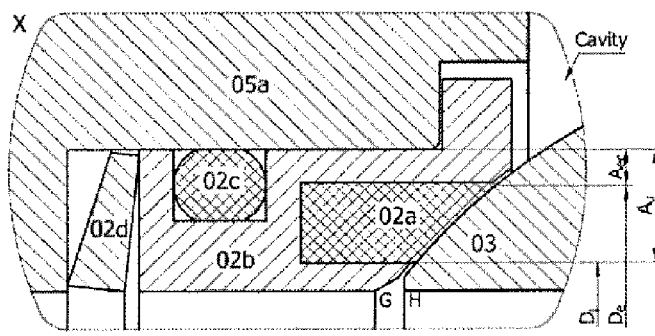
Fig.10 Floating Seats of the Prior Art
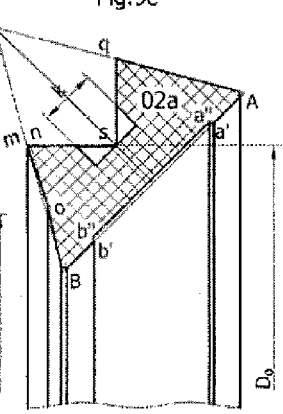
Fig.9e

US 8,864,105 B2

BALL VALVE SEATS AND BALL VALVES DESIGNED WITH EQUILATERAL TRIANGLE SECTION METHODS

TECHNICAL FIELD OF THE INVENTION

The invention relates to ball valves used for fluid power and general use, more particularly to floating ball valves, trunnion-mounted ball valves and seat-mounted ball valves.

TECHNICAL BACKGROUND OF THE INVENTION

A ball valve is a kind of ball valves using a ball as the on-off member; the valve is fully open when turned to where the central through bore of the ball is coaxial with the valve passage, and fully closed when perpendicular to the valve passage. The prior art has had two types of ball valves, one floating ball valve and one trunnion-mounted ball valve. The invention, besides improving the designs of the two types of ball valves, proposes a seat-mounted ball valve. As we know, the floating ball valve is a kind of ball valves whose on-off ball is to float and whose seats is generally mounted under medium pressure for realizing the tight closure, whereas the trunnion-mounted ball valve is a kind of ball valves whose on-off ball is mounted in valve body by trunnions or whose seat is to float under medium pressure for realizing the tight closure. Therefore, the seat-mounted ball valve of the invention is a kind of ball valves whose on-off ball is mounted in valve body by valve seats, or neither whose seat nor whose ball is to float under medium pressure for realizing the tight closure.

The task of ball valve seats is to provide the oblique interface and seal between the on-off ball and the valve body. Therefore, a ball valve seat has at least three surfaces at an angle to each other: a ball-sealing surface, a body-sealing surface and a body-supported surface for force equilibrium. If designed only with the three surfaces, the ball valve seat would be enclosed for compression or have no exposure when the valve is fully closed or opened, or be of a triangular section.

The ball valve seat with an equilateral triangle as its section, having an equal acting force and an unequal bearing area for its each surface (due to a different forming radius), just satisfies the needs of unequal stresses for its each surface; the high stress on its ball-sealing surface is just its need for dynamic sealing, the intermediate stress on its body-sealing surface just its need for static sealing, and the low stress on its supported surface just its need for sliding on its supporting surface. Furthermore, the seat only with an equilateral triangle as its section can avoid a sharp corner weaker than 60°. Therefore, if of a triangular section, ball valve seats should be of an equilateral triangle section.

A polymer, such as PTFE, is the commonest valve seat material and typically has viscoelasticity, or has both viscous behavior of dense liquid (its strain lagging behind its stress) and elasticity of stable solid (its strain proportional to its stress). The viscous behavior of the seat material under unenclosed compression surely causes the material to creep (causing a sealing stress relaxation) or to gradually deform and flow into extrusion gaps (causing a seal failure). Therefore, if the seat material is regarded as a most viscous liquid, the seat under enclosed compression is like the hydraulic oil in cylinders with no compressive deformation, no extrusive deformation or rupture and nowhere to creep as long as the extrusion gap is enough small, and has an actual bearing strength far higher than its material allowable strength.

Generally speaking, polymers used for valve seats, such as PTFE, have more than ten times the coefficient of thermal expansion of steel. Therefore, the more the mass or the greater the size of the material used for a valve seat, the more the thermal deformation of the seat relative to the valve body and the more likely to cause a seal failure. In other words, using an equilateral triangle section of ball valve seats can minimize their mass or size and further the thermal influence on their sealing reliability.

Heretofore, however, there have been no consideration of either using a ball valve seat of equilateral triangle sections or designing a ball valve seat or giving its dimensions by an equilateral triangle, and no further consideration of enclosing a ball valve seat for work as fully as possible.

A common ball valve seat has two exposures to the conveyed medium; one is exposed to and directly compressed by the medium in the flow passage, and the other, exposed to and directly compressed by the medium in the valve body cavity between the on-off ball and the valve body.

In order to prevent the upstream seat from being extruded or trapped into the central through hole of the on-off ball by the medium pressure on the seat exposure in the passage at the moment the valve is closing or opening, U.S. Pat. No. 6,948,699 designed a valve seat that is constrained in its mounting hole by a small inward circumferential step at the seat-mounting hole edge or by an O-ring between the seat and its mounting hole wall.

In order to reduce the extrusive flow and deformation of valve seat materials at the seat exposure in the cavity, a stop ring was increased on the exposure in U.S. Pat. No. 3,721,425, U.S. Pat. No. 4,410,165 and U.S. Pat. No. 6,969,047.

U.S. Pat. No. 293,057 and U.S. Pat. No. 4,385,747 prove that the prior art has often provided some axial vent grooves on the periphery of the seat ring to vent the fluid on the seat end face into the valve body cavity and to prevent the load on the upstream seat from being added on the ball and increasing the downstream seat load and the valve operation torque; however, at the moment the valve is fully opening, the horizontal portion of the seat will just face the ball bore and lose the spherical support of the ball, and the seat may be locally extruded into the ball bore and damaged if there is a flow through the seat end and the vent grooves; for this reason, the prior art can not help increasing the valve seat strength by enlarging its size or outside diameter or thickness and cause the valve seat to be more exposed.

In a word, the prior art has not known that the exposures of a ball valve seat have an influence on the free floating of its on-off ball, but has always thought that the ball of a floating ball valve will unconditionally float onto the downstream seat and enhance the tight closure thereon as the medium pressure increases.

As to the floating ball valve, as shown in FIG. 5, $A_s$ represents the actuating area of medium on the ball, the circular area determined by the diameter $D_s$; p, the medium pressure; $W_s = A_s p$, the ball floating force from medium (the thrust of medium on the ball); and $W_2$, the ball clamping force from the seat. It is imaginable that the action force between the ball and the downstream seat is $W_2$ when $W_s \leq W_2$ (at the time $W_s$ is only to partially or just fully replace $W_2$ at most but not added to the downstream seat), and is $W_s$ but not $W_2$ when $W_s > W_2$ (at the time $W_2$ has been fully replaced by $W_s$); i.e. as to the floating ball valve, the sealing force between the ball and the seat is either $W_2$ or $W_s$ or to realize the tight closure of a floating ball valve is to rely either on the ball clamping force $W_2$ from the seat or on the ball floating force $W_s$ from medium but never on both at the same time. Nevertheless, whichever to rely on shall be m times the unsealing force of medium on the seat (the thrust of medium on the seat) according to the concept of Appendix 2, Division 1, Volume VIII, ASME Boiler and Pressure Vessel Code; i.e. it is when $W_2$ or $W_s$ equals $m(A_e+A_c)p$ that a floating ball valve can realize its reliable tight closure, where $A_e$ is the seat's annular area exposed in the cavity, $A_c$ the seat's annular area covered by the ball, $A_e+A_c=A_u$ the annular actuating area of medium on the seat to cause unsealing, p the pressure and m (the sealing maintaining factor)=the sealing actuation force/the unsealing actuation force. In other words, it is conditional for a floating ball valve to realize its tight closure by floating of its ball.

Supposing the closing seal of floating ball valves to be a self-energized seal, according to the concept of self-energized seals in Appendix 2, Division 1, Volume VIII, ASME Boiler and Pressure Vessel Code, the sealing maintaining factor m required of their seat is:

$$m=[(W_2-H)/A_e p] \geq 0,$$

or in mechanics the required of their seat is $W_2 \geq H = A_e p$ (see FIG. 5),
where
$W_2$=ball clamping forces from seats,
H=actuation forces $A_e p$ of medium on seat's annular exposures in cavity,
$A_c p$=actuation forces of medium on seat's annular areas covered by balls,
$A_e$=seat's annular areas exposed in cavity,
$A_c$=seat's annular areas covered by balls, including non-contact areas $A_{ep}$,
p=medium pressure.

In other words, a floating ball valve will always maintain its tight closure by the ball floating force from medium as long as $W_2$ (ball clamping forces from seats) is not less than $A_e p$ (actuation forces of medium on seat's annular exposures in cavity).

In fact, a floating ball valve can not always maintain its tight closure by the ball floating force when $W_2 \geq A_e p$). For example, as shown in FIG. 5, when $W_s$ (thrust of medium on balls)=$W_2$ (ball clamping forces from seats), there must be $W_2(=W_s=A_s p) \gg A_e p$ because $A_s$ (actuating areas of medium on balls) $\gg A_e$ (seat's annular areas exposed in cavity), which has fully satisfied the above mentioned condition that $W_2(=A_s p)$ is not less than $A_e p$; but at the time, the ball just fully away from the upstream seat (because $W_s$ is supposed to equal $W_2$) will also lose the sealing contact with its downstream seat when in an eccentric drive inevitable and insurmountable: as soon as the acting $W_s$ of the ball on the downstream seat is counteracted to a certain extent by the disturbing force resulted from the eccentric drive, the ball will get away from the intimate contact with its downstream seat and cause the pressurized medium more and more to permeate into the downstream seat areas covered by the ball so as to finally output a disturbing force $A_c p$ pushing the ball fully off its downstream seat; the greater the force $A_e p$ exerted on the seat exposure in the cavity, the more difficult the reviving of the ball clamping force $W_2$ from the seat, which has been replaced by $W_s$, and the more beneficial to that the disturbing force $A_c p$ separates the ball from the downstream seat instantaneously; the ball, once away from the intimate contact with its two seats at the same time, will have medium actuation forces cancelling out each other and only float between its two seats or never recover the intimate contact with its two seats, however high the medium pressure p is; even the higher the medium pressure p, the larger the thrust $(A_e+A_c)p$ of medium between and against the two seats and the more beneficial to that the ball has a more sufficient floating room between the two seats. In other words, it is impractical to consider the tight closure of floating ball valves per self-sealing or to ensure that their $W_2$ (ball clamping forces from seats) is not less than their $A_e p$ (actuation forces of medium on seat exposures in cavity), for such a consideration can not eliminate the inherent ball-wedged disturbance from eccentric drive and not ensure the reliability of the tight closure.

From the above analysis, it can be seen that the seat's annular area $A_e$ exposed in the cavity and the seat's annular area $A_c$ covered by the ball are definitely related to an amplified output of the ball-wedged disturbance from eccentric drive, but the disturbing actuation force $A_c p$ of medium on the seat's annular area $A_c$ has been definitely excluded in concepts and formulas when considering the closing seal of floating ball valves according to a self-energized seal. Therefore, such a consideration can not relate at all the resistance to the ball-wedged disturbance from eccentric drive and the seat's annular area $A_e$ exposed in the cavity as well as the seat's annular area $A_c$ covered by the ball.

Supposing the closing seal of floating ball valves to be a non-self-energized seal, according to the concept of non-self-energized seals in Appendix 2, Division 1, Volume VIII, ASME Boiler and Pressure Vessel Code, the sealing maintaining factor m required of their seat is:

$$m = W_s / W_u \geq 2$$
$$= A_s p / (A_e + A_c) p \geq 2$$
$$= A_s / (A_e + A_c) \geq 2$$

$$m = \frac{D_s^2}{D_o^2 - D_i^2} \geq 2$$

where
$W_s = A_s p$, ball-floated sealing forces (ball-floating forces or thrust of medium on balls)
$W_u = (A_e + A_c)p$, unsealing forces of medium on seats (thrust of medium on seats)
$A_s$=actuating areas of medium on balls (circular areas of dia.$D_s$) to result in sealing
$A_e$=seat's annular areas exposed in cavity
$A_c$=seat's annular areas covered by balls, including non-contacting areas $A_{ep}$
$A_e+A_c=A_u$=annular actuating areas of medium on seats to cause unsealing
p=medium pressure, $D_o$=outside diameters of seats
$D_s$=actuating diameters of balls against seats, $D_i$=inner diameters of seats.

In other words, to ensure:
$W_s \geq 2W_u$ (that the ball-floated sealing force from medium is not less than twice the unsealing force of medium on the seat), or
$A_s \geq 2(A_e+A_c)$ (that the actuating area of medium on the ball is not less than twice the annular actuating area of medium on the seat)

can ensure that the seat of a floating ball valve always keeps a tight closure when impacted by disturbance, especially by ball-wedged disturbance from eccentric drive under any pressure.

In fact, any seat of floating ball valves is an upset impulse amplifier; the ball's wedging force from eccentric drive is the input impulse, the actuation force $A_c p$ of medium on the seat's annular area covered by the ball is the output impulse, and the actuation force $A_e p$ of medium on the seat's annular area exposed in the valve body cavity is equivalent to the "D.C. output"; the greater the $A_e p$ the more beneficial to the output of impulses with a larger amplitude; actually, the greater the $A_e$p, the more difficult the reviving of the ball clamping force $W_2$ from the seat, and the more beneficial to that the disturbing output $A_c$p separates the ball from the downstream seat instantaneously. The thrust $W_u=(A_e+A_c)$p of medium on seats is the unsealing actuation force; the greater the $(A_e+A_c)$p, the more enlarged the ball seating room and the more beneficial to that the ball leaves its seats for free floating but not for sealing. The thrust $W_s=A_s$p of medium on balls is the sealing actuation force; the greater the $A_s$p, the more beneficial to that the ball resists to its separation from its downstream seat to keep its sealing status. Therefore, $m=W_s/W_u=A_s/(A_e+A_c)$ is an inherent characteristic index or the sealing maintaining factor of the ball valve seat; the greater the value of m, the better the disturbance resistance of the seat; if the disturbance resistance of the seat is not enough or the disturbance resistance index m of the seat is too small, it means that the ball-floated pressure on the downstream seat can not resist to the ball wedged disturbance from eccentric drive so as for the seat to perform its tight closure only by its clamping force $W_2$. In fact, the ball valve whose design is like a floating ball valve but whose ball is clamped too tight by its seats to float should be called a seat-mounted ball valve or a formal or false floating ball valve. As shown in FIG. 5, the closing or working condition for formal floating ball valves is $W_2>W_s=A_s p=m(A_e+A_c)p$, and for real floating ball valves, $W_s=A_s p=m(A_e+A_c)p>W_2$.

Since the prior art has been far away from the above-mentioned sealing science and can not make use of the ball-floating force $W_s$ from medium but can not help relying on the bigger than $W_s$ ball-clamping force $W_2$ from seats to realize the tight closure of floating ball valves, all the floating ball valves of the prior art must be the formal floating ball valve whose on-off ball is clamped too tight by its two seats to float within the whole working pressure range.

As to the seat of floating ball valves, since its disturbance resistance factor $m=A_s/(A_e+A_c)$ (the actuating area of medium on the ball over the actuating area of medium on the seat), it is of importance to manage to reduce as fully as possible the actuating area $(A_e+A_c)$ of medium on the seat, especially the useless exposed area $A_e$ thereof, within the material allowable strength in order to decrease the amplified output of the ball wedged disturbance from eccentric drive and maintain a more reliable tight closure by floating ball; i.e. it is not significant to dispute if the specific value (2) of disturbance resistance factor m given above by rules of thumb is enough accurate.

According to the concepts in ASME Code, the ball pre-clamping force from the seats of floating ball valves as a self-energized seal is responsible only for providing the minimum seating stress y required of the seat under no medium pressure, only relevant to materials and sealing contact designs. As to a certain design of sealing contacts, the minimum seating stress y required of the seat only relates to its material yield strength, which may be construed as the stress getting the material yielded and seated into irregularities on the joint surface and whose theoretical value should approximate to the material yield strength but whose practical value is only a major percent of the material yield strength because the practical contacting area is only a major percent of the stress calculating area. According to the invention, a sealing design can always ensure its sealing material both a full microcosmic deformation stress by line contacts and a safest macrocosmic stress by surface contacts protecting the line contact from for ever disappearing, as long as the seal design is of a microline contact followed by a microsurface contact or of a microsawtoothed contact or of both a line contact followed by a surface contact and a surface contact having a permanent line contact therein. If the microline contact followed by a microsurface contact is used in the sealing design of valve seats, any valve seat, whether it is made of metal or non-metal, requires of its closing seal only a seating force so small as to be negligible because a small pressing load can produce an approximate infinite contacting stress by the microline contact whose contacting area approximates to zero. In other words, if designed by the microline contact followed by a microsurface contact and supposed to be a non-self-energized seal, a mounted seat for floating ball valves can use a ball clamping force so small as to be negligible and that a small thrust of medium on the ball can replace the ball clamping force from the upstream seat and make the ball be separated from its upstream seat, thus resulting in that the rotation resistance to the ball and the load of the seat under medium pressure is only from the thrust $W_s$ of medium on the ball and under no medium pressure, only from the negligible ball-clamping forces $W_2$ of the two seats.

As shown in U.S. Pat. No. 7,243,900 (CN2713240), US20030111631, U.S. Pat. No. 6,948,699, U.S. Pat. No. 4,658,847, U.S. Pat. No. 4,557,461, U.S. Pat. No. 4,502,663, U.S. Pat. No. 4,457,491, U.S. Pat. No. 4,236,691, U.S. Pat. No. 4,235,418, U.S. Pat. No. 2,963,263, U.S. Pat. No. 2,945,666 etc., the prior art has thought that the tight closure of floating ball valves is naturally self-energized but never considered the actuating area of medium on their seat, especially the influence of their seat exposure area on its self-sealing action, and neither considered the relationship between their ball-clamping force $W_2$ and their self-energized tight closure so as to make their seat have a considerable medium actuation area $(A_e+A_c)$ or have a high power amplifying capability for the ball wedged disturbance from eccentric drive, and hence the floating ball valves of the prior art are actually only the formal or false floating ball valve whose tight closure is realized only by the ball-clamping force $W_2$ from the seats but not by the ball-floating force $A_s$p from medium. Since the tight closing condition of formal floating ball valves is $W_2>W_s=A_s p$, it is necessary to ensure that their mounted seat can provide a ball clamping force $W_2$ $(>1.1 A_s p_w)$ in order for them to pass the closure test of 1.1 times the working pressure $p_w$ specified by the standards, where $A_s$ is the actuating area of medium on the ball. Therefore, the ultimate rotation torque of the prior floating ball valves is generated at least by the ball clamping force $2*1.1 A_s p_w$ from their two seats but not by the maximum force $1.1 A_s p_w$ only from one of their two seats.

In summary, it can be seen from the above analyzing of floating ball valves by applying the concept in ASME Code that supposing their closing seal to be a self-energized seal is undoubtedly not considering any influence of the other factors on the floating of their on-off ball in concepts and designs, naturally incapable of excluding the influence of the ubiquitous ball-wedged disturbance from eccentric drive so as for their closing seal to be far away from the self-sealing advantage, and unconsciously thoroughly discarding their natural ball-floating force from medium and extra using ball clamping forces from their seats for their tight closure; however, supposing their closing seal to be a non-self-energized seal comes to make their closing seal have the self-sealing advantage only to rely on their natural ball-floating force from medium but not on extra ball-clamping forces from their seats for their tight closure only by reducing the actuating area of medium on their seat or decreasing the amplifying of their ball wedged disturbance from eccentric drive; obviously, the development of knowledge about their tight closure from "self-sealing" of the prior art to "non-self-sealing" of the invention is a reversing development of thinking way and naturally results in a revolutionary change for them, which is amazing but verifiable to see that the maximum force causing their rotation resistance or the maximum load on their seats will be reduced from at least $2*1.1A_s p_w$ to at most $A_s p_w$, decreased at least by 1.1 times.

The floating ball valve is characterized by simple design, low cost and easy maintenance, while the trunnion mounted ball valve, in contrast, by complex design, high cost and difficult maintenance. The original purpose of substituting the trunnion mounted ball valve for the floating ball valve is to use another bearing instead of the downstream seat for bearing the thrust of medium on the ball in order to enable a soft seat to be burdened with a higher closing pressure, or to make a great size of ball valves not be limited to material strength of their seats. The additional result is decreasing operation torque when using the trunnion mounted ball valve instead of the floating ball valve. Since the seat of the invention can decrease the operation torque of floating ball valves of the prior art by at least 50%, the cheap and reliable floating ball valve can be substituted for the expensive trunnion mounted ball valve in a greater size if the seat of the invention can have an extra allowable compressive stress?

ISO 14313/API 6D specifies that a ball valve shall be provided with an automatic pressure relief to prevent the pressure trapped in the body cavity from exceeding 1.33 times the valve pressure rating (for the medium trapped in the body cavity when valve opens or closes will be thermally expanded to breed a dangerous pressure), and that the fire resistance design of valves shall be qualified by fire testing in accordance with ISO 10497 (API 6FA). To satisfy the requirement of the pressure relief of the ball valve cavity, U.S. Pat. No. 4,557,461, U.S. Pat. No. 4,385,747, U.S. Pat. No. 4,236,691, U.S. Pat. No. 3,488,033, GB2023773 etc. propose some complex pressure relieving seats. To pass the fire resistance test, WO82/03898 proposes a complex fire resistance design of seats. All these complex patented valve seats can be omitted if the equilateral triangle section of ball valve seats enclosed for being compressed in accordance with the invention is naturally able to satisfy the requirements of the pressure relief and the fire resistance specified in ISO 14313/API 6D?

A metallic seat of ball valves is essential for a high temperature service. However, as shown in U.S. Pat. No. 4,940,208, U.S. Pat. No. 4,502,663, U.S. Pat. No. 4,262,688, U.S. Pat. No. 4,235,418, U.S. Pat. No. 4,147,327 etc., the metallic and non-metallic seats for a floating ball valve have a design different from each other, and as shown in U.S. Pat. No. 7,032,880, U.S. Pat. No. 4,601,308, U.S. Pat. No. 4,318,420, U.S. Pat. No. 3,752,178, U.S. Pat. No. 3,164,362, U.S. Pat. No. 3,269,691 etc., the floating seat assembly for trunnion mounted ball valves has always an O-ring unsuitable for a high temperature service and results in that they have nothing to do with the metallic seat for a high temperature service. So what a wonderful thing it is supposing that the triangle-sectional seat of the invention can have the metallic and non-metallic seats for a floating ball valve unified into one design and provide a floating seat assembly without an O-ring for a mounted ball valve design!

SUMMARY OF THE INVENTION

What technical problem for the invention to solve is to propose a principle and method for designing ball valve seats and hereby to provide a series of ideal ball valve seats.

The principle and method for designing ball valve seats proposed by the invention mainly includes the following points:
  a The ball valve seat should be of the section which is as unexposed and as approximate to an equilateral angle whose side is the ball-sealing chord as possible.
  b It is conditional for the closing seal of floating ball valves to work according to self-sealing; as shown in FIG. 5, it is when $W_s = m(A_e + A_c)p > W_2$ and m is enough big that floating ball valves can realize their tight closure relying on the floating of their ball, or else only on the ball clamping force $W_2$ from their seats, where $W_s$=ball-floated sealing forces or the ball-floated pressure or ball-floating forces from medium (thrust of medium on balls), $W_2$=ball clamping forces from seats, $A_e$=seat's annular areas exposed in cavity, $A_c$=seat's annular areas covered by balls (including non-contacting areas $A_{ep}$), $A_e + A_c = A_u$=annular actuating areas of medium on seats, p=medium pressure, m (sealing maintaining factor or disturbance resistance index of seats)=the sealing actuation force divided by the unsealing actuation force.
  c It is inevitable for the tight closure of a ball valve to be disturbed by its ball's wedging action, and its ball seat is an upset impulse amplifier with an inherent disturbance resistance index m; as shown in FIG. 5, the disturbance resistance index m $[=A_s p/(A_e+A_c)p = D_s^2/(D_o^2 - D_i^2)]$ of the seat for floating ball valves determines their disturbance resistance for sealing services, where $A_s$=actuating areas of medium on balls (circular areas of dia.$D_s$), $A_e$=seat's annular areas exposed in cavity, $A_c$=seat's annular areas covered by balls (including non-contacting areas $A_{ep}$), $A_e + A_c = A_u$=annular actuating areas of medium on seats, p=medium pressure, $A_s p$=ball-floated sealing forces or the ball-floated pressure or ball-floating forces from medium (thrust of medium on balls), $(A_e+A_c)p$=unsealing forces of medium on seats (thrust of medium on seats), $D_o$=outside diameters of seats, $D_s$=actuating diameter of balls against seats, $D_i$=inside diameter of seats; i.e. the greater the disturbance resistance factor m of their seat, the stronger the disturbance resistance of their sealing design; in other words, it should be to the maximum extent possible on the premise of not exceeding the material allowable strength to make the mounted seat for floating ball valves have a reduced actuating area ($A_e + A_c$) of medium on the seat, especially a reduced useless exposed area $A_e$ thereof, so as to have a decreased amplified output of the ball wedged disturbance from eccentric drive and a more reliable closing seal.
  d The floating ball valve whose seat has not enough disturbance resistance can maintain its tight closure only by the ball clamping force $W_2$ from its seats but not by the thrust $W_s$ of medium on its ball, and actually is only a formal floating ball valve whose ball looks floatable in design.
  e A sealing contact can always ensure its sealing material a full microcosmic deformation stress by line contacts and also a safest macrocosmic stress by surface contacts protecting the line contact from forever disappearing, as long as the sealing contact is of a microline contact followed by a microsurface contact or of a microsawtoothed contact or of both a line contact followed by a surface contact and a surface contact having a permanent line contact therein. If designed by the microline contact followed by a microsurface contact, any valve seat, whether it is made of metal or non-metal, requires of its closing seal only a seating force so small as to be negligible because a small pressing load can produce an approximate infinite contacting stress by the microline contact whose contacting area approximates to zero. In other words, to decrease the ball-clamping force from valve seats and make more effective use of the self-sealing performance of floating balls or seats, any ball valve seat made of high strength material, especially of metal, should use the microline contact followed by a microsurface contact as its sealing design.

What is shown in FIGS. 1 and 2 is an identical usual floating ball valve respectively in its fully open and closed positions, where seat 02 is responsible for providing the mounting joint, the rotating support and the closing seal of ball 03 in valve body 01, the fastening engagement of end cover 05 and the valve body by threads for providing the mounting or fixing of the ball and the seats in the valve body, gasket 04 for providing the sealing of the body joint, valve stem 06 for providing the rotating operation of the ball, and a stem packing assembly for providing the sealing of the stem. As the invention only relates to using various sections of valve seats for realizing the mounting joint, the rotating support and the tight closure of the ball in the valve body, a variety of technical solutions including floating seats for trunnion-mounted ball valves of the invention can be enough illustrated to a usual skilled technician only by using some partial or partially enlarged views corresponding to FIGS. 1 and 2 and including the valve body, the valve seat and the on-off ball. In literal descriptions, the "mounted seat" refers to the usual seat for floating ball valves but actually may float a bit, the "floating seat" refers to the usual seat for mounted ball valves but actually the on-off ball may also float a bit, the "projection" refers to the projection on related coordinate planes or coordinate axes in the coordinate system with the centerline of the ball central bore as axis X, and the phrases "(the seat) designed according to (equilateral) triangle section methods", "(the seat) designed with an (equilateral) triangle as its section factor/constituent/outline" and "(the seat) designed with its section approximate to an (equilateral) triangle" are sometimes similar in meaning.

As shown in FIG. 7a (the enlargement of local view X in FIG. 1a), any usual mounted seat 02 for floating ball valves includes an inherent section-designing equilateral triangle ABC in its section, whose side AB determines the ball-sealing cone of the seat (i.e. side AB is the chord opposite to the sealing arc or the ball sealing chord of the seat), whose side BC does the sealing end surface of the seat (i.e. the projection CF' of side BC may be the sealing end side of the section of the seat), whose side CA does the supported cylindrical surface of the seat (i.e. the projection CD of side CA is the generatrix of the cylindrical surface of the seat), whose ball-sealing chord length does the allowable load of the material selected for the seat, whose vertex C does the exposing degree of the seat, and whose vertexes A, B and C does the diameters ($D_s$=actuating diameter of the ball on the seat, $D_i$=inside diameter of the seat and $D_o$=outside diameter of the seat) and the disturbance resistance factor $m=D_s^2/(D_o^2-D_i^2)$ or the sealing reliability of the floating ball valve. In fact, any ball valve seat, however different its sectional shape and designing detail are, can be designed or developed by using an equilateral triangle as its section designing essential to control the essential characteristic of ball valves. Therefore, the invention proposes designing ball valve seats according to equilateral triangle section methods.

As shown in FIG. 6 (the ball 03 and its seat-designing equilateral triangle extracted from FIG. 1a), the ball sealing arc or the ball sealing chord AB of the section-designing triangle ABC of the seat should be symmetrically arranged within the datum segment A'B' demarcated by the projection line and the tangent B"A' of the ball's small circle d' on the ball end face in the two positions of the ball rotated for 90° in order to enable the sealing arc (surface) to fully press on the ball surface and keep its sealing readiness when the valve is fully opened or closed; letting the end A of the ball-sealing chord AB be beyond the tangent B"A' of the circle d', the end face of the ball in the fully closed position (as shown by dashed lines in FIG. 2b) will rest on and be seated in the ball-sealing surface and cause the seat to be deformed or damaged; letting the end B of the ball-sealing chord AB be beyond the ball end face will cause the seat a reduced inside diameter or cause the upstream seat to wash away or to be extruded, or cause the seat an increased ball-covered area $A_{ep}$ or cause the downstream seat to have a reduced disturbance resistance (as shown in FIG. 5b). Since there always exists an equation of B"O'=B"O=r' independent of the magnitude of the ball diameter d and the ball's small circle diameter d', the ball-sealing chord AB of the section-designing triangle ABC of the ball valve seat is at a 45 degree angle to the bore centerline of the ball. Therefore, the invention proposes a mounted seat for floating ball valves designed with an equilateral triangle ABC as its section factor (see FIG. 7a), wherein side AB of the said triangle ABC is the ball sealing chord of the said seat, the surface of revolution of either the projection or the extended projection of side BC is the sealing end surface of the said seat, the surface of revolution of the projection of side CA is the supported cylindrical surface of the said seat, and vertex C is an intersection of the outline of the said seat; the said sealing chord (AB) is at a 45 degree angle to the axis of the central bore of the said ball, i.e. the said ball-sealing surface of the said seat is premanufactured into either a 90° conical surface concentric with the said seat and to be intersected with the said ball or a cambered surface generated with the said 90° conical surface intersected with the said ball; the length of the said ball-sealing chord and the intersection position of the outline of the said seat is determined by the material allowable strength and the disturbance resistance factor m required of the said seat.

The above mentioned mounted seat is only a common seat for floating ball valves which is of using an equilateral triangle as their seat section factor but not as their seat section outline and aimed at improving their closing tightness and reducing their operation torque primarily by controlling the orientation and length of the ball-sealing chord AB of their seat-designing triangle ABC and their seat exposure or disturbance resistance factor m. The improved seat, mainly featuring a simplest structure and a lowest cost, neither thoroughly solves the problems such as crept or extruded deformation of its material caused by its exposures nor fully satisfies the requirements for some special applications, such as the fire resistance service specified in API 6D. The so-called fire resistance ball valve refers to the valve whose tight closure is performed by the metal to non-metal contact between its ball and its seat under normal working conditions and by the metal to metal contact between its ball and its body under fire conditions; i.e. the fire resistance ball valve needs a sealing lip on its body which approximates to but does not contact with its ball under normal working conditions so as to get into the metal to metal sealing contact on burning away its non-metallic seat. Therefore, in order to meet requirements of the fire resistance design specified in API 6D, the invention proposes a mounted seat for floating ball valves designed with an equilateral triangle ABC as its section constituent (see FIG. 8a), wherein side AB of the said triangle ABC is the ball sealing chord of the said seat, the surface of revolution of side BC is the sealing end surface of the said seat, the surface of revolution of the projection of side CA is the supported cylindrical surface of the said seat, and vertex C is an intersection of the outline of the said seat; the said sealing chord (AB) is at a 45 degree angle to the axis of the central bore of the said ball, i.e. the said ball-sealing surface of the said seat is premanufactured into either a 90° conical surface concentric with the said seat and to be intersected with the said ball or a cambered surface generated with the said 90° conical surface intersected with the said ball; the length of the said ball-sealing chord and the intersection position of the outline of the said seat is determined by the material allowable strength and the disturbance resistance factor m required of the said seat.

The above mentioned mounted seat for floating ball valves designed with an equilateral triangle as its section constituent is to eliminate its seat exposure only in the valve passage but not in the body cavity. In order to eliminate the seat exposures in both the passage and the cavity, the invention proposes a mounted seat for floating ball valves designed with an equilateral triangle ABC as its section outline and composed of an inner sealing ring (inner ring) and an outer supporting ring (outer ring) (see FIG. 9a), wherein the said inner ring is of using the said equilateral triangle ABC as its section outline: side AB of the said triangle ABC is the ball sealing chord of the said seat, the surface of revolution of side BC is the sealing end surface of the said seat, and the surface of revolution of side CA is the supported surface of the said inner ring; the said outer ring is of a trapezoid section, whose height side 91 is the generatrix of the cylindrical surface of the said outer ring or the said seat, between which and whose accommodating bore in the valve body is a clearance fit, and whose oblique side 92 is the generatrix of the conical surface for supporting the said inner ring; the said ball under fluid pressure presses at the same time the said outer ring and the said inner ring mutually supported to make both be initiatively pressed to protect each other from being pressed; the said outer ring is made of higher strength material than the said inner ring. As shown in FIG. 9b, the thrust of medium on the ball is $(\lambda D_s^2 p/4=) F_s = F \cos \alpha + F \sin \beta$ (where $F \cos \alpha$ is the axial component on the inner ring, $F \sin \beta$ is the axial component on the outer ring, F is the normal force on each inner ring surface, $\alpha$ is 45°, $\beta$ is 15°, p is the medium pressure, and $D_s$ is the actuating diameter of the ball on the seat), the total normal force on the joint ball-supporting surface of the inner and outer rings is $F_s/\cos \alpha$ and the radial or normal force on the surface of the inner ring is only F; i.e. the ratio of the bearing capacity of the sealing material used for the double ring seat to that used for the single ring seat is $(F_s/\cos \alpha)/F = 1 + \sin \beta/\cos \alpha = 1.366$, which actually is because that the inner ring of the invention is using two surface to bear the thrust of medium on balls and the single ring seat is using one surface. In addition, the inner ring is almost enclosed for being compressed and, like the oil in a hydraulic cylinder, has no compressive deformation, no extrusive deformation or rupture and nowhere to creep and hence can have an actual bearing strength far higher than its material allowable strength. Therefore, the assembled seat of the invention can ensure that the soft material with excellent sealing property is used for a higher pressure limit of valves and has a longer lifetime and a higher reliability.

Generally speaking, high pressure applications require non-metal or metal valve seats with high strength, and high temperature services require metal valve seats. In order to increase the sealing performance of the high strength seat, particularly the one of the metallic seat, and to decrease the operation torque of floating ball valves, the invention especially proposes a mounted hard seat for floating ball valves designed with an equilateral triangle ABC as its section factor (see FIGS. 7a and 7c), wherein the surface formed by rotating side AB of the said triangle ABC is the original ball-sealing cone of the said seat, the surface formed by rotating either the projection or the extended projection of side BC is the original sealing end surface of the said seat, and the surface formed by rotating the projection of side CA is the original supported cylindrical surface of the said seat; in accordance with final requirements of elastic deformation for the said seat, the said original cylindrical surface and the said original end surface are partially cut small and short to make the said original cylindrical surface become a stepped cylindrical outside surface and the intersection circle of the newly-developed cylindrical surface and end surface be away from the vertex C of the said triangle ABC along its altitude passing through the vertex C as the cutting develops, and an annular groove, if necessary, is cut out whose bottom surface is tangent to the said intersection circle and parallel to the said original ball-sealing cone; it is needed for two sawtooth rings to be developed in the said original ball-sealing cone by cutting out another cut of conical surfaces symmetrically arranged about the said side AB and parallel to the said original ball-sealing cone and having a radial distance $Z_t$ away from the on-off ball surface passing through the vertexes of the said sawtooth rings, which means the height of the said sawtooth rings is $Z_t$ relative to the said on-off ball surface; another two or more sawtooth rings with a height of $Z_t$ may be developed or may not on the remaining end surface, and if not, a soft gasket with a configuration and volume equivalent to the cut out part is required. The crest of all the sawtooth rings is a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) surface protecting the line contact thereon from for ever disappearing so that it can be easy to realize the sealing of the precision machined surface without lapping. The tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain sealing surface, the smaller the ratio of the tooth pitch $X_s$ to the tooth height $Z_t$, the more the number of the bearing teeth, the slower the velocity at which each line is followed by a surface, and vice versa; using a different number of teeth in a certain sealing surface may result in a different velocity for each single tooth, but the total velocity or the total sealing effect for them may not change much or a sealing design of more teeth may have the same sealing effect as the one of less teeth to some extent. If the velocity is different at which a line is followed by a surface, the faster the velocity, the larger the sealing contact area, the smaller the sealing contact stress, the more decreased the rotational resistance and the sealing performance, and vice versa.

The invention also proposes a mounted hard seat for floating ball valves designed with an equilateral triangle ABC as its section constituent (see FIGS. 8a and 8c), wherein the surface formed by rotating side AB of the said triangle ABC is the original ball-sealing cone of the said seat, the surface formed by rotating side BC is the original sealing end surface of the said seat, and the surface formed by rotating the projection of side CA is the original supported cylindrical surface of the said seat; in accordance with final requirements of elastic deformation for the said seat, the said original cylindrical surface and the said original end surface are partially cut small and short to make the said original cylindrical surface become a stepped cylindrical outside surface and the intersection circle of the newly-developed cylindrical surface and end surface be away from the vertex C of the said triangle ABC along its altitude passing through the vertex C as the cutting develops, and an annular groove, if necessary, is cut out whose bottom surface is tangent to the said intersection circle and parallel to the said original ball-sealing cone; it is needed for two sawtooth rings to be developed in the said original ball-sealing cone by cutting out another cut of conical surfaces symmetrically arranged about the said side AB and parallel to the said original ball-sealing cone and having a radial distance $Z_t$ away from the on-off ball surface passing through the vertexes of the said sawtooth rings, which means the height of the said sawtooth rings is $Z_t$ relative to the said on-off ball surface; another two or more sawtooth rings with a height of $Z_t$ may be developed or may not on the remaining end surface, and if not, a soft gasket with a configuration and volume equivalent to the cut out part is required. The crest of all the sawtooth rings is a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) bearing surface protecting the line contact thereon from for ever disappearing so that it can be easy to realize the sealing of the precision machined surface without lapping. The tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain sealing surface, the smaller the ratio of the tooth pitch $X_s$ to the tooth height $Z_t$, the more the number of the bearing teeth, the slower the velocity at which each line is followed by a surface, and vice versa; using a different number of teeth in a certain sealing surface may result in a different velocity for each single tooth, but the total velocity or the total sealing effect for them may not change much or a sealing design of more teeth may have the same sealing effect as the one of less teeth to some extent. If the velocity is different at which a line is followed by a surface, the faster the velocity, the larger the sealing contact area, the smaller the sealing contact stress, the more decreased the rotational resistance and the sealing performance, and vice versa.

The invention also proposes a mounted hard seat for floating ball valves designed with an equilateral triangle ABC as its section outline and composed of an inner sealing ring (inner ring) and an outer supporting ring (outer ring) (see FIGS. 9a and 9e), wherein the said inner ring is of using the said equilateral triangle ABC as its section outline: the surface formed by rotating side AB of the said triangle ABC is the original ball-sealing cone of the said seat, the surface formed by rotating side BC is the original sealing end surface of the said seat, and the surface formed by rotating side CA is the original supported surface of the said inner ring; the said outer ring is of a trapezoid section, whose height side is the generatrix of the cylindrical surface of the said outer ring or the said seat, between which and whose accommodating bore in the valve body is a clearance fit, and whose oblique side is the generatrix of the conical surface for supporting the said inner ring; the said ball under fluid pressure presses at the same time the said outer ring and the said inner ring mutually supported to make both be initiatively pressed to protect each other from being pressed; the said outer ring is made of higher strength material than the said inner ring; in accordance with final requirements of elastic deformation for the said inner ring, the said original supported surface and the said original sealing end surface of the said inner ring are partially cut small and short to form a new cylindrical surface and a new end surface and to make the intersection circle of the said new cylindrical surface and end surface be away from the vertex C of the said triangle ABC along its altitude passing through the vertex C as the cutting develops, and an annular groove, if necessary, is cut out whose bottom surface is tangent to the said intersection circle and parallel to the said original ball-sealing cone; it is needed for two sawtooth rings to be developed in the said original ball-sealing cone by cutting out another cut of conical surfaces symmetrically arranged about the said side AB and parallel to the said original ball-sealing cone and having a radial distance $Z_t$ away from the on-off ball surface passing through the vertexes of the said sawtooth rings, which means the height of the said sawtooth rings is $Z_t$ relative to the said on-off ball surface; another two or more sawtooth rings with a height of $Z_t$ may be developed or may not on the remaining end surface of the said inner ring, and if not, a soft gasket with a configuration and volume equivalent to the cut out part is required. The crest of all the sawtooth rings is a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) bearing surface protecting the line contact thereon from for ever disappearing so that it can be easy to realize the sealing of the precision machined surface without lapping. The tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain sealing surface, the smaller the ratio of the tooth pitch $X_s$ to the tooth height $Z_t$, the more the number of the bearing teeth, the slower the velocity at which each line is followed by a surface, and vice versa; using a different number of teeth in a certain sealing surface may result in a different velocity for each single tooth, but the total velocity or the total sealing effect for them may not change much or a sealing design of more teeth may have the same sealing effect as the one of less teeth to some extent. If the velocity is different at which a line is followed by a surface, the faster the velocity, the larger the sealing contact area, the smaller the sealing contact stress, the more decreased the rotational resistance and the sealing performance, and vice versa.

As shown in FIG. 10, the floating valve seat of the prior art, composed of a sealing ring 02a, a supporting ring 02b, an O-ring 02c and a preloading spring 02d, always has an O-ring unsuitable for high temperature services so as to make the trunnion mounted ball valve have almost had nothing to do with the metallic seat for high temperature services. As the medium pressure is increased to some extent, the preloading spring 02d will take no effect on the supporting ring 02b so that under disturbance the upstream seat can be away from the sealing contact with its ball and return back to being repushed by the preloading spring to cause the seat and the ball a back-and-forth vibration during operation, for the sealing actuation area of medium on the seat is always equal to the unsealing actuation area $A_u = \pi D_o^2/4 - \pi D_i^2/4$ of medium on the seat, or the front medium actuation area of the seat (at the side close to the ball) is always equal to the back medium actuation area of the seat (at the side far away from the ball), or the disturbance resistance factor m of the seat is always 1. To avoid the vibration during operation, the prior art has to use a spring preload greater than the ultimate sealing actuation force of medium on the seat, which is equivalent to increasing the disturbance resistance factor of the seat, and causes the sealing ring and the ball to be always under the ultimate pressure and maximizes both the crept deformation of the sealing material and the rotation resistance to the ball.

In order to improve the sealing performance of floating seats for ball valves, the invention especially proposes a floating seat for mounted ball valves designed with an equilateral triangle ABC as its section outline and composed of a sealing ring, a supporting ring, a clamping ring, a sealing gasket and a preloading spring (see FIG. 11), wherein the said sealing ring is the floating sealing element of the said seat and is of using the said equilateral triangle ABC as its section outline: the surface formed by rotating arc AB opposite to side AB of the said triangle ABC is the ball-sealing surface of the said seat, the surface formed by rotating side BC is the clamped surface of the said sealing ring, and the surface formed by rotating side CA is the supported surface of the said sealing ring; the said supporting ring is responsible for providing a sealing support for the said supported surface after completing the fastening and sealing connection with the valve end cover by a thread engagement and the said sealing gasket; the said preloading spring provides an initial seating stress for the said sealing ring by the said clamping ring, and a medium pressure provides a sealing stress for the said sealing ring by the said clamping ring or not by. The medium pressure can only indirectly press the sealing ring through the clamping ring if there is a tight engagement between the clamped surface and the clamping surface, and if not therebetween, the medium can freely enter the contact surface and directly press the sealing ring. It has a higher sealing efficiency, without friction loss, for medium to directly press on the sealing ring.

In order to further break through the limitation of trunnion mounted ball valves in high temperature and high pressure services, the invention especially proposes a floating hard seat for mounted ball valves designed with an equilateral triangle ABC as its section outline and composed of a sealing ring, a supporting ring, a clamping ring, a sealing gasket and a preloading spring (see FIGS. 11a and 11h), wherein the said sealing ring is the floating sealing element of the said seat and is of using the said equilateral triangle ABC as its section outline: the surface formed by rotating side AB of the said triangle ABC is the original ball-sealing cone of the said seat, the surface formed by rotating side BC is the original clamped surface of the said sealing ring, and the surface formed by rotating side CA is the original supported surface of the said sealing ring; in accordance with final requirements of elastic deformation for the said sealing ring, the said original clamped surface and the said original supported surface of the said sealing ring are partially cut small and short to form a new cylindrical surface and a new end surface and to make the intersection circle of the said new cylindrical surface and end surface be away from the vertex C of the said triangle ABC along its altitude passing through the vertex C as the cutting develops, and an annular groove, if necessary, is cut out whose bottom surface is tangent to the said intersection circle and parallel to the said original ball-sealing cone; it is needed for two sawtooth rings to be developed in the said original ball-sealing cone by cutting out another cut of conical surfaces symmetrically arranged about the said side AB and parallel to the said original ball-sealing cone and having a radial distance $Z_t$ away from the on-off ball surface passing through the vertexes of the said sawtooth rings, which means the height of the said sawtooth rings is $Z_t$ relative to the said on-off ball surface; another two or more sawtooth rings with a height of $Z_t$ may be developed or may not on the remaining supported surface of the said inner ring, and if not, a soft gasket with a configuration and volume equivalent to the cut out part is required. The crest of all the sawtooth rings is a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) bearing surface protecting the line contact thereon from for ever disappearing so that it can be easy to realize the sealing of the precision machined surface without lapping. The tooth height $Z_t$ determines the deforming measure of the line contact, and the ratio of the tooth pitch $X_s$ to the tooth height $Z_t$ does the velocity at which the line contact is followed by the surface contact or the extent to which the line contact is provided and protected. In a certain sealing surface, the smaller the ratio of the tooth pitch $X_s$ to the tooth height $Z_t$, the more the number of the bearing teeth, the slower the velocity at which each line is followed by a surface, and vice versa; using a different number of teeth in a certain sealing surface may result in a different velocity for each single tooth, but the total velocity or the total sealing effect for them may not change much or a sealing design of more teeth may have the same sealing effect as the one of less teeth to some extent. If the velocity is different at which a line is followed by a surface, the faster the velocity, the larger the sealing contact area, the smaller the sealing contact stress, the more decreased the rotational resistance and the sealing performance, and vice versa. The said supporting ring is responsible for providing a sealing support for the said supported surface after completing the fastening and sealing connection with the valve end cover by a thread engagement and the said sealing gasket; the said preloading spring provides an initial seating stress for the said sealing ring by the said clamping ring, and a medium pressure provides a sealing stress for the said sealing ring by the said clamping ring or not by. The medium pressure can only indirectly press the sealing ring through the clamping ring if there is a tight engagement between the clamped surface and the clamping surface, and if not therebetween, the medium can freely enter the contact surface and directly press the sealing ring. It has a higher pressurizing efficiency, without friction loss, for medium to directly press on the sealing ring.

As shown in FIG. 11a, the floating seat designed with an equilateral triangle as its section outline, with a sealing actuation area $A_s=\pi D_o^2/4-\pi D_i^2/4$ for medium on the seat and an unsealing actuation area $A_u=\pi D_u^2/4-\pi D_i^2/4$ for medium on the seat or with a disturbance resistance factor $m=A_s/A_u=(D_o^2-D_i^2)/(D_u^2-D_i^2)>1$ (due to $D_o>D_u$), can have an increased disturbance resistance and a decreased spring load in addition to avoiding use of O-rings so as both to decrease the operation torque and to eliminate the vibration during operation, compared to the prior art shown in FIG. 10.

The floating seat designed with an equilateral triangle as its section outline, having a supporting ring both conveniently made of the material suitable for metal to metal seals and conveniently assembled or adjusted to the positioning state that it approximates to the contact with its ball, can correspondingly have a ball which is almost mounted by the supporting rings but not by the trunnions including a stem as a trunnion. If mounted by the supporting rings, the ball will also need to float slightly; it is the first sealing action for the ball to float slightly onto the supporting ring of the downstream seat, and the second sealing action for the sealing ring of the upstream seat to float slightly onto the ball. The ball valve whose seat and ball both float a bit can both provide a more reliable closure and meet the requirement of the double block and bleed valve, and is also the most suitable for designing the metallic seat ball valves.

The task of ball valve seats is to provide the interface and seal between their ball and their valve body, and their ball-sealing cone or sealing datum surface is at a 45 degree to their machined surfaces and their installing surfaces in their valve body. Accordingly, a ball valve seat has at least three surfaces at an angle to each other: a ball-sealing surface, a body-sealing surface and a body-supported surface for force equilibrium. If designed only with the three surfaces, the ball valve seat would be enclosed for compression or have no exposure when the valve is fully closed or opened, or be of a triangular section. If unexposed, the soft seat with excellent sealing property can, like the oil in a hydraulic cylinder, have no compressive deformation, no extrusive deformation or rupture and nowhere to creep, and have an actual bearing strength far higher than its material allowable strength, a higher applicable pressure limit, a longer service life and a higher reliability. If of equilateral triangle sections, the ball valve seat features an equal acting force and an unequal bearing area for its each surface (due to a different forming radius) and just ideally meets the needs of unequal stresses for its each surface: the high stress on its ball-sealing surface is just its need for dynamic sealing, the intermediate stress on its body-sealing surface just its need for static sealing, and the low stress on its supported surface just its need for sliding on its supporting surface. Furthermore, the ball valve seat, only with an equilateral triangle as its section, can avoid a sharp corner weaker than 60°, and hence theoretically had better be of an equilateral triangle section with no exposure. Therefore, in the invention, the ball valve seat with an equilateral triangle as its section outline is the most ideal cheap seat designed with its section equal to an equilateral triangle, the ball valve seat with an equilateral triangle as its section constituent is the cheaper ideal seat designed with its section more approximate to an equilateral triangle, and the ball valve seat with an equilateral triangle as its section factor is the cheapest ideal seat designed with its section approximate to an equilateral triangle.

It is possible to use a variety of materials with different strength to meet the needs of various pressure ratings of valve seats, a variety of mirosawtooth rings with different tooth pitch to adjust the seating force for different materials, a variety of section-designing triangles with slightly different side length to adjust the seat precompressing allowance for different materials on the premise of keeping a constant seat outside diameter, and a variety of rear-cutting volumes to give the high strength seat a suitable elasticity and precompressing allowance, so that any ball valve seat of the identical sizes in various pressure ratings can be designed by one section-designing triangle in accordance with the invention whether made of metal or nonmetal and whether of a mounted seat for floating ball valves or a floating seat for mounted ball valves. Therefore, it can unify the seat mounting dimensions and the ball designing dimensions of various ball valves for an identical size and effectively promote their standardized production to design their seats according to equilateral triangle section methods. For example, a single ring seat of ball valves designed with equilateral triangle section methods and with its disturbance resistance factor m=2 can be used for valves whose pressure rating is 10 MPa when selecting the Polytetrafluoroethylene (PTFE) whose tensile strength is 33 MPa, for valves whose pressure rating is 15 MPa when selecting the polyoxymethylene (POM) whose tensile strength is 45 MPa, for valves whose pressure rating is 25 MPa when selecting the polyetheretherketone (PEEK) whose tensile strength is 90 MPa, and for valves whose pressure rating is 42 MPa when selecting the polyparaphenylene (PPP) whose tensile strength is 207 MPa.

It needs to be especially pointed out that the floating seat for mounted ball valves with its disturbance resistance factor m equal to 1 can recover its sealing contact with its ball by preloading springs but not automatically by medium pressure after disturbance disappears, but the floating seat with its disturbance resistance factor m more than 1 can automatically recover its sealing contact with its ball by medium pressure after disturbance disappears as long as the preloading spring can provide some necessary initial seating on the supported surface of its sealing ring; that the mounted seat for floating ball valves needs a disturbance resistance factor greater than the floating seat because the floating ball can not automatically recover its sealing contact with its seat (can only float between its two seats for ever) after separated from its seat due to disturbance; and that theoretical calculation proves that the disturbance resistance factor m of floating seats for the mounted ball valve of the prior art can only be 1, while practical calculation shows that a seat of the invention used as the mounted seat of floating ball valves with a disturbance resistance factor m equal to 2 can only have a disturbance resistance factor m equal to $\sqrt{2}$ when used as the floating seat of mounted ball valves, and hence the triangular sealing ring whose strength and disturbance resistance can meet the needs of mounted seats can also meet the needs of floating seats in addition to that the disturbance resistance factor m of mounted seats can be designed as needed and that the mounted seat has a load greater than the floating seat. Therefore, a section-designing triangle for mounted seats can be used for designing the corresponding floating seat to unify the basic design of the two seats in identical sizes.

It has been clear that the tight closure of floating ball valves is realized either by the ball clamping force from seats or by the ball floating force from medium but never by both at the same time, and indeed the disturbance resistance factor also determines that they can not take effect in turn; if realized by the ball clamping force from seats, the tight closure will fail after their wear or their crept or extruded deformation at exposures; if realized by the ball floating force from medium, the tight closure will not be affected by the wear or the crept or extruded deformation of seats; and therefore the mounted seat for floating ball valves designed according to an equilateral triangle can make its service life from "limited" to "unlimited" in addition to that their tight closure can be kept positively by their ball floating force. The service life of a mounted seat for floating ball valves might have been "unlimited", but its service life, as shown in US20030111631 (a typical formal floating ball valve), is too limited for the prior floating ball valves to be called a real floating ball valve.

It has also been clear that the mounted seat for floating ball valves designed according to an equilateral triangle can ensure that their tight closure is realized by their ball floating force from medium but not by their ball clamping force from seats, and hence the ball clamping force from seats may be so small as to be negligible and that the ball in its full closing position is always floated tight on its downstream seat or that the rotation resistance to the ball is only from its downstream seat with a ball-pressing force equal to the thrust of medium on the ball and up to maximum under the ultimate medium pressure; however, the floating ball valve of the prior art can only realize its tight closure by its ball clamping force from its seats more powerful than the ultimate thrust of medium on its ball, so that the maximum rotation resistance to the ball or the maximum operation torque is from its two seats which respectively have one ball-pressing force greater than the ultimate thrust of medium on its ball. Therefore, in brief, the floating ball valve designed according to an equilateral triangle of the invention decreases its maximum operation torque caused by its seats at least by half as compared with that of the prior art.

It has also been clear that the ball valve seat designed with equilateral triangles as its section factor or constituent can eliminate its unnecessary exposures and its crept or extruded deformation (its sealing stress relaxation) to the maximum extent possible, while the ball valve seat designed with equilateral triangles as its section outline can be enclosed for being compressed to a considerable extent and can, like the oil in a hydraulic cylinder, have no compressive deformation, no extrusive deformation or rupture and nowhere to creep, and have an actual bearing strength far higher than its material allowable strength. Therefore, the ball valve seat designed according to equilateral triangles can ensure that the soft material with excellent sealing property is used for a higher pressure limit of valves and has a longer lifetime and a higher reliability.

It is because the mounted seat for floating ball valves designed according to an equilateral triangle can considerably decrease their ultimate operation torque and increase their seat material's allowable stress that the cheap and reliable floating ball valve can be substituted for the expensive trunnion-mounted ball valve within a greater application field.

It also needs to be further pointed out that the microline contact followed by a microsurface contact, or the microsawtooth ring contact, can effectively provide a seating stress necessary for sealing materials by the cutting line contact and also ensure them a safest allowable stress by the surface contact following the cutting line contact, which can increase the sealing performance and also decrease the preclamping force of seats to balls and reduce the operation torque, and is very suitably used to design the seals made of both high and low strength materials; for example, it can meet the needs of initial low pressure services by the line contact and then the needs of later high pressure services by the auto-deformed spherical surface contact to use a premade 90° conical surface but not a premade spherical surface as the ball sealing surface of seats, thus avoiding the useless crept deformation; however, only the ball valve seat designed according to equilateral triangles can ensure that it may have a ball clamping force so small as for the line contact to show its advantage. Therefore, it can be said that the section-designing method according to the equilateral triangle and the seal-designing method according to the microline contact followed by a microsurface contact are mutually supported and relied on in the designing of ball valve seats.

The medium may be trapped in the body cavity and thermally expanded to breed a high pressure while a ball valve is in its fully closed or opened position, and therefore ISO 14313/API 6D specifies that the ball valve shall be provided with an automatic pressure relief to prevent the pressure trapped in the body cavity from exceeding 1.33 times the valve pressure rating. As shown in FIG. 5a, the pressure trapped in the floating ball valve cavity relative to atmosphere (or with $W_s=0$) is determined by the ball clamping force $W_2$ from seats. As shown in FIGS. 10 and 11a, the pressure trapped in the mounted ball valve cavity relative to atmosphere (or with valve ends vented to atmosphere) is determined by the spring preload of seats on the ball. The greater the clamping force or spring preload of seats on the ball, the stronger the pressure trapping capability of the cavity to atmosphere; i.e. the magnitude of the trapped pressure is the symbol of the ball clamping or pressing level from the seat during assembly. Therefore, decreasing of the ball clamping force from mounted seats or spring preload of floating seats during assembly is the primary means to solve the pressure trapped in the ball valve body cavity.

As shown in FIG. 5, maintaining the tight closure of floating ball valves of the prior art needs the ball clamping force $W_2$ from seats to equal m times the unsealing actuation force $(A_e+A_c)p$ of medium on seats $[W_2=m(A_e+A_c)p]$, namely needs the pressure of $W_2$ to equal m times the medium pressure p, and the medium pressure for the closure test specified by standards shall not be less than 1.1 times the rated working pressure p; accordingly, passing the closure test needs a pressure of $W_2$ not to be less than 1.1 m times the rated working pressure p for floating ball valves, and similarly, also needs a pressure of spring preload not to be less than 1.1 m times the rated working pressure p for mounted ball valves. Therefore, it is quite understandable that the ball valves of the prior art are all the valve which can trap a pressure of at least 1.1 times the rated working pressure p in its body cavity, and be required by ISO 14313/API 6D to pass a qualified test with the pressure trapped in its body cavity within marginally 1.33 times the rated working pressure p to atmosphere.

The ball valve seat of the invention, designed according to equilateral triangles, can ensure that keeping the tight closure of ball valves does not rely on the ball clamping force either from mounted seats or from the spring preload of floating seats, and the sealing design of the microline contact followed by a microsurface can also ensure that any material of seats only need a little ball clamping force for their initial seating stress. Therefore, the ball clamping force from mounted seats or from floating seats can be so small as to be in the level of bars or not greater than a fifteenth of the pressure rating as demonstrated by testing; i.e. it is unnecessary at all to consider the pressure trapping problem in the valve cavity of the ball valves in accordance with the invention.

Therefore, it has been too clear according to the invention that it is unnecessary for 14313/API 6D to require that ball valves shall be provided with an automatic pressure relief for their body cavity, and according to the pressure relieving specification for their the body cavity in 14313/API 6D that the floating ball valves of the prior art is only the formal floating ball valve whose ball looks floatable but actually can not float at all under pressure; i.e. that the ball valves whose pressure trapped in their cavity can be up to and over 1.1 times the rated working pressure p are surely of the prior art, and positively lower than the rated working pressure p, surely of the invention.

BRIEF DESCRIPTION OF DRAWINGS

FIGS. 1a and 2a are an identical usual floating ball valve respectively in its fully open and closed positions, where seat 02 is responsible for providing the mounting joint, the rotating support and the closing seal of ball 03 in valve body 01, the fastening engagement of end cover 05 and the valve body by threads for providing the mounting or fixing of the ball and the seats in the valve body, gasket 04 for providing the sealing of the body joint, valve stem 06 for providing the rotating operation of the ball, and a stem packing assembly for providing the sealing of the stem. The seat 02 is a mounted seat designed with an equilateral triangle as its section factor in accordance with the invention.

Figure 7A:
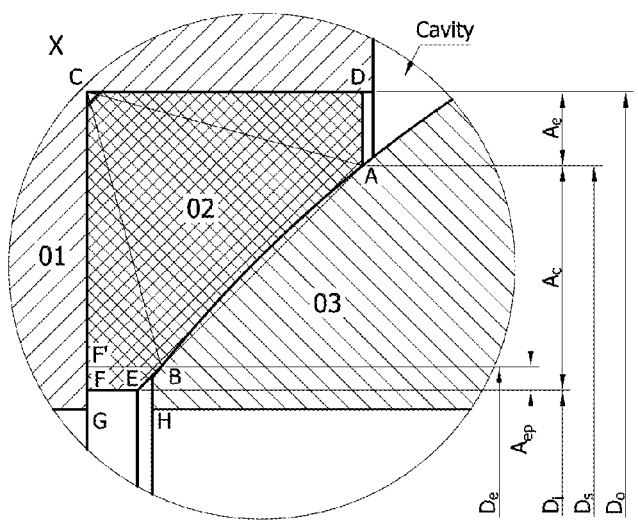

As the invention only relates to using various sections of valve seats for realizing the mounting joint, the rotating support and the tight closure of the ball in the valve body, a variety of technical solutions including floating seats for trunnion-mounted ball valves of the invention can be enough illustrated to a usual skilled technician only by using some partial or partially enlarged views corresponding to FIGS. 1a and 2a and including the valve body 01, the valve seat 02 and the on-off ball 03. To facilitate reading the views, the valve body cavities are used as orienting features and marked with "Cavity" in relative views.

FIG. 1b is a view of local section A-A in FIG. 1a, and FIG. 2b is a view of local section B-B in FIG. 2a, which are used to illustrate adequately the fully opening and the fully closing designs of a ball valve along with FIGS. 1a and 2a to prepare for disclosing various sections of valve seats by using some partial views corresponding to them. The dashed line in FIG. 2b is not the hidden design line in FIG. 2a but the supposed line used to show that the seat incorrectly goes beyond the boundary line A'B" in FIG. 6a.

FIG. 3 corresponds to FIG. 2b; FIG. 2b shows the seat 02 and the on-off ball 03 in the fully closed position, and FIG. 3 shows the seat 02 and the on-off ball 03 at the moment the valve is opening. FIGS. 4a and 4b are two enlargements of the local view Y' in FIG. 3, but the sealing end surface and the inside diameter of the seat in FIG. 4a are determined by vertex B of the section-designing equilateral triangle ABC, and the sealing end surface and the inside diameter of the seat in FIG. 4b are determined by point E of the extended AB. The valve seat 02 in FIG. 4a has no extended segment BE as in FIG. 4b which can press the seat end tight on the valve body 01 by medium pressure thereon at the moment the valve is opening, and may be pressed into the through hole of the ball by the medium on the seat end to cause a damage, while the valve seat 02 in FIG. 4b has the extended segment BE which can prevent the medium from wetting the seat end to stop the seat from being pressed into the through hole of the ball.

FIG. 5a is the valve seat 02 and the on-off ball 03 in FIG. 2a, and FIG. 5b is an enlargement of the local view Z in FIG. 5a, where p=medium pressure, $W_2$=ball clamping forces from seats (represents the valve body 01 in FIG. 2a), $W_s$=ball-floated sealing forces (thrust of medium on balls) $A_s p$, $A_s$=actuating areas of medium on balls (circular areas of dia.$D_s$), $A_e$=annular areas of seats exposed in cavity, $A_c$=annular areas of seats covered by balls, $D_s$=actuating diameters of balls against seats, $D_o$=outside diameters of seats, $D_i$=inside diameters of seats, and $D_e$=diameters corresponding to annular areas $A_{ep}$ of seats exposed in passage; the seat's annular area $A_c$ covered by balls is the disturbance picking-up area and composed of a ball-contacting area and a non-ball-contacting area; the ball-contacting area bears the sealing loads but picks up disturbance, and the non-ball-contacting area $A_{ep}$, not bearing any sealing load but also picking up disturbance, should be subject to a strict control.

According to the invention, diameters $D_s$, $D_o$ and $D_i$ and their relative annular areas $A_s$, $A_e$ and $A_c$, as shown in FIG. 5b, are determined by the magnitude and orientation of the section-designing equilateral triangle, and determine the ball-sealing performance or sealing maintaining factor m of valve seats:

$$m = A_s p / (A_e + A_c) p$$
$$= A_s / (A_e + A_c)$$
$$= D_s^2 / (D_o^2 - D_i^2).$$

$$\left( m = \frac{\text{thrust of medium on balls}}{\text{thrust of medium on seats}} \right)$$

As shown in FIG. 5a, the action force between the ball and the downstream seat is $W_2$ when $W_s \leq W_2$ (at the time $W_s$ is only to partially or just fully replace $W_2$ at most but not added to the downstream seat), and is $W_s$ but not $W_2$ when $W_s > W_2$ (at the time $W_2$ has been fully replaced by $W_s$); i.e. as to the floating ball valve, the sealing force between the ball and the seat is either $W_2$ or $W_s$, to realize the tight closure of a floating ball valve is to rely either on the ball clamping force $W_2$ from the seat or on the ball floating force $W_s$ from medium but never on both at the same time. Nevertheless, whichever to rely on shall be m times the unsealing force of medium on the seat (the thrust of medium on the seat) according to the concept of Appendix 2, Division 1, Volume VIII, ASME Boiler and Pressure Vessel Code; i.e. it is when $W_2$ or $W_s$ equals $m(A_e + A_c)p$ that a floating ball valve can realize its reliable tight closure. Therefore, designing a ball valve seat is designing its section-designing equilateral triangle.

FIGS. 6a and 6b are illustrations for designing a section-designing equilateral triangle ABC of ball valve seats according to the invention, and FIG. 6b is an enlargement of the local view X' in FIG. 6a. The central bore $D_o$ of the on-off ball 03 is given by relative valve standards, and the diameter d' of the ball's small circle on the ball end face is given by designers according to the strength parameter "wall thickness/bore" of the ball at its entrance and can be given according to the formula: $d'=1.04D_n$. Based on given d', the diameter d of ball's great circles can be given according to the needed angle $\alpha_0$ and the formula: $d=d'/\sin \alpha_0$; theoretically the angle $\alpha_0$ is exactly corresponding to the factor m given by designers according to the need of disturbance resistance, and actual calculations show that m=2 corresponds to $\alpha_0=38°$, m=1.8 corresponds to $\alpha_0=37°$, and m=1.5 corresponds to $\alpha_0=35.5°$. Then based on diameter segment d' and circles d' and d, the datum segment A'B' of the equilateral triangle ABC can be determined by AutoCAD drawing. At last based on the segment A'B', the side AB of the equilateral triangle ABC can be determined by AutoCAD (drawing a side AB parallel to and symmetric about A'B' and equal to 0.9 times the segment A'B' on circle d). It is easy to see that the orientation angle $\alpha$ (=45°) of the equilateral triangle ABC is determined by the tangent segment B"O' (=r') and the radius segment B"O (=r') of the circle d'.

Figure 7B:
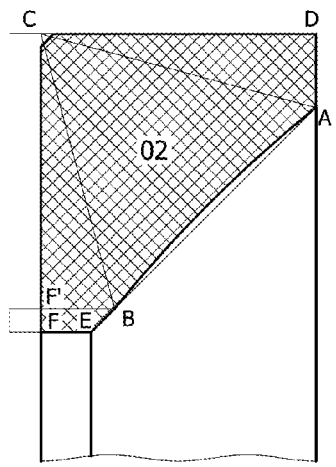
Figures 7C, 7D, 7E:
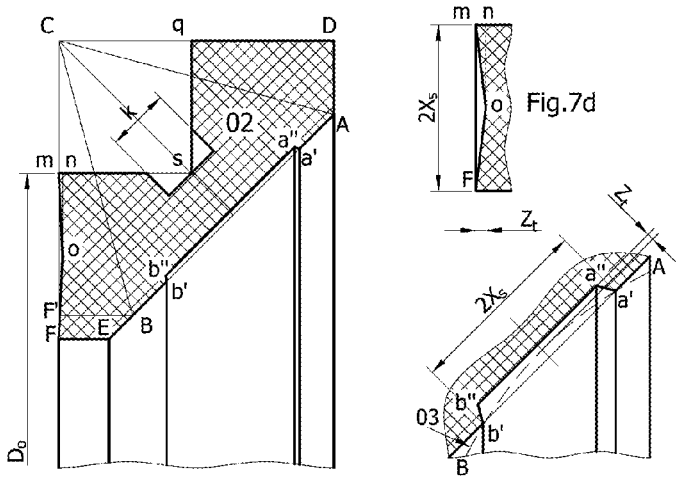

FIG. 7a is an enlargement of the local view X in the FIG. 1a showing that the interfacing of the on-off ball 03 with the valve body 01 is performed by a mounted seat 02 designed with an equilateral triangle as its section factor in accordance with the invention. FIG. 7b is the seat 02 in FIG. 7a. FIG. 7c is the seat substituted for the seat in FIG. 7b. FIG. 7d is an exaggerated sectional view of the microsawtooth rings m and F on the sealing end surface in FIG. 7c. FIG. 7e is an enlargement of the microsawtooth rings a' and b' in the ball-sealing cone AB in the FIG. 7c. The design shown in FIG. 7b is applicable to low strength material, while the design shown in FIG. 7c is applicable to high strength material.

Figure 8A:
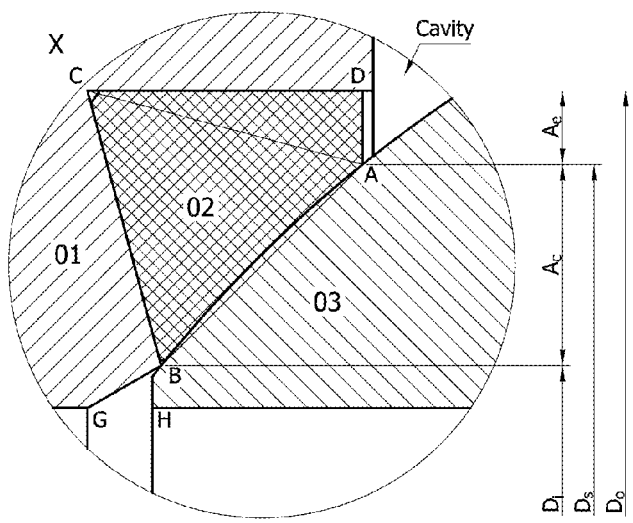
Figure 8B:
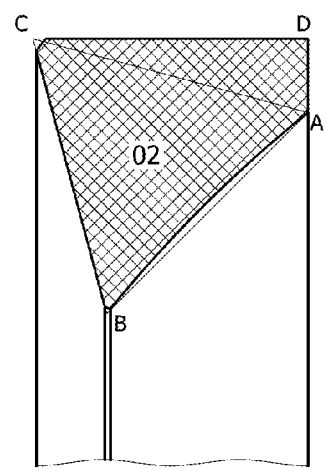
Figure 8C:
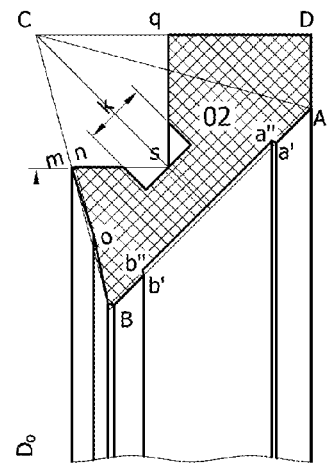

FIG. 8a is a corresponding enlargement of the local view X in FIG. 1a showing that the interfacing of the on-off ball 03 with the valve body 01 is performed by a mounted seat 02 designed with an equilateral triangle as its section constituent in accordance with the invention. FIG. 8b is the seat 02 in FIG. 8a. FIG. 8c is the seat substituted for the seat in FIG. 8b. The exaggerated details see FIG. 7d for the microsawtooth rings m and F (not marked) on the sealing end surface in FIG. 8c. The enlarged details see FIG. 7e for the microsawtooth rings a' and b' in the ball-sealing cone AB in FIG. 8c. The design shown in FIG. 8b is applicable to low strength material, while the design shown in FIG. 8c is applicable to high strength material.

FIG. 9a (an enlargement corresponding to the local view X in FIG. 1a) and FIG. 9b (an enlargement corresponding to the local view Y in FIG. 2b) show that the interfacing of the on-off ball 03 with the valve body 01 are performed by a mounted seat assembly 02 composed of an inner sealing ring 02a and an outer supporting ring 02b and designed with an equilateral triangle as its section outline in accordance with the invention. FIG. 9c is the inner sealing ring 02a in FIGS. 9a and 9b. FIG. 9d is the outer supporting ring 02b in FIGS. 9a and 9b. FIG. 9e is the ring substituted for the inner sealing ring 02a in FIG. 9c. The exaggerated details see FIG. 7d for the microsawtooth rings m and F (not marked) on the sealing end face in FIG. 9e. The enlarged details see FIG. 7e for the microsawtooth rings a' and b' in the ball-sealing cone AB in FIG. 9e. The design shown in FIG. 9c is applicable to low strength material, while the design shown in FIG. 9e is applicable to high strength material. It can be seen from FIG. 9b that the thrust of medium on the ball is $(\pi D_s^2 p/4=) F_s = F \cos \alpha + F \sin \beta$ (where $F \cos \alpha$ is the axial component on the inner ring, $F \sin \beta$ is the axial component on the outer ring, F is the normal force on each inner ring surface, $\alpha$ is 45°, $\beta$ is 15°, p is the medium pressure, and $D_s$ is the actuating diameter of the ball on the seat), the total normal force on the joint ball-supporting surface of the inner and outer rings is $F_s / \cos \alpha$ and the radial or normal force on the surface of the inner ring is only F; therefore, the ratio of the bearing capacity of the sealing material used for the double ring seat to that used for the single ring seat is $(F_s / \cos \alpha) / F = 1 + \sin \beta / \cos \alpha = 1.366$.

FIG. 10 is an enlargement corresponding to the local view X in FIG. 1a showing a floating seat for trunnion mounted ball valves of the prior art, where part 05a is another kind of valve end covers similar to the valve end cover 05 in FIG. 1a. As shown in FIG. 10, the floating seat of the prior art is composed of a sealing ring 02a, a supporting ring 02b, an O-ring 02c and a preloading spring 02d, and always has an O-ring unsuitable for high temperature services so as to make the trunnion mounted ball valve have almost had nothing to do with the metallic seat for high temperature services. The annular sealing actuation area of medium on the seat is always equal to the annular unsealing actuation area $(A_u = \pi D_o^2/4 - \pi D_i^2/4)$ of medium on the seat, namely, its sealing maintaining factor m=1, so that the spring preload must be greater than the ultimate sealing actuation force of medium on the seat to be capable of avoiding the vibration of the sealing ring during operation.

Figure 11A:
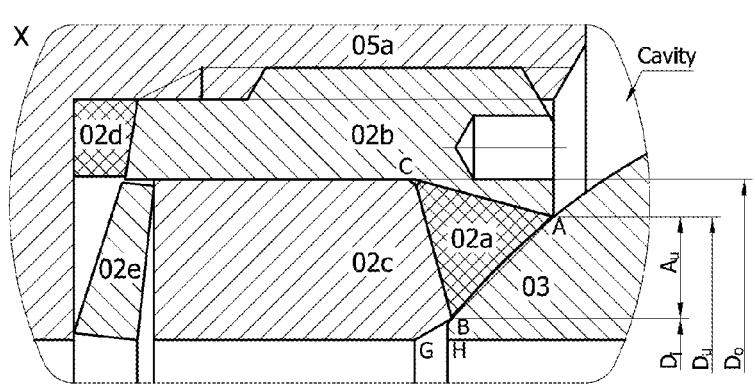
Figure 11H:
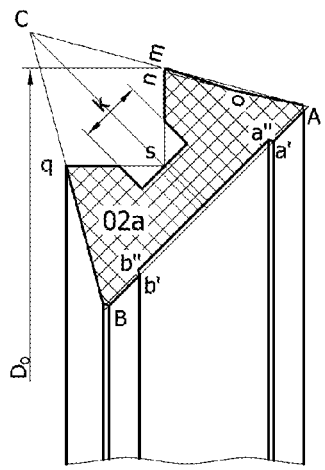
Figure 11B:
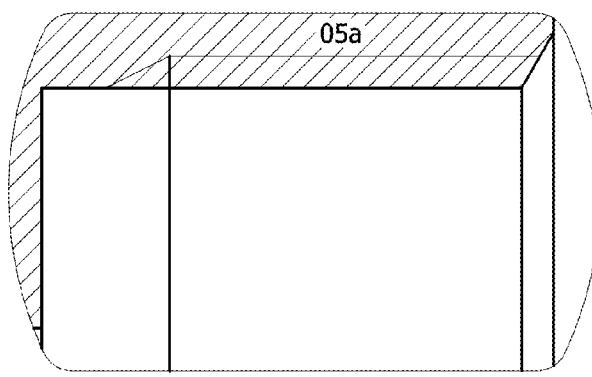
Figure 11C:
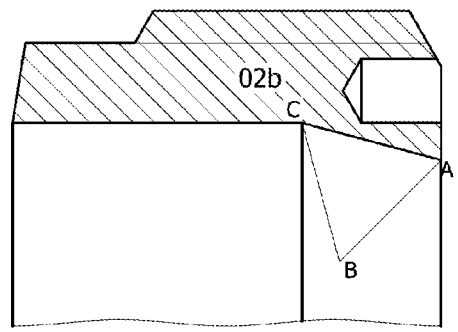
Figure 11D:
Figure 11E:
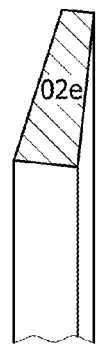
Figure 11F:
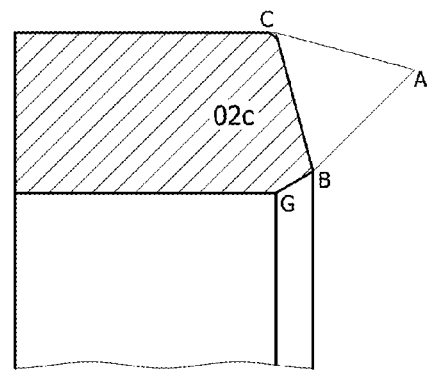

FIG. 11a is an enlargement corresponding to the local view X in FIG. 1a showing that interfacing of the on-off ball 03 with the valve end cover 05a is performed by a floating seat assembly 02 composed of a sealing ring 02a, a supporting ring 02b, a clamping ring 02c, a sealing gasket 02d and a preloading spring 02e and designed with an equilateral triangle ABC as its section outline in accordance with the invention, where part 05a (see FIG. 11b) is another kind of valve end covers similar to the valve end cover 05 in FIG. 1a, whose fastening and sealing connection with the floating seat assembly is completed by a thread engagement and the sealing gasket, and whose connection with the valve body is completed by another bolts. FIGS. 11c~11g are respectively the supporting ring 02b, the sealing gasket 02d, the preloading spring 02e, the clamping ring 02c and the sealing ring 02a in FIG. 11a. FIG. 11h is the sealing ring substituted for the sealing ring in FIG. 11g. The exaggerated details see FIG. 7d for the microsawtooth rings m and F (not marked) on the sealing end surface in FIG. 11h. The enlarged details see FIG. 7e for the microsawtooth rings a' and b' in the ball-sealing cone AB in FIG. 11h. Compared to the prior art shown in FIG. 10, floating seats of the invention not only avoid using an O-ring in designs but also have a disturbance resistance factor greater than 1 and a decreased spring load so as both to decrease the operation torque and to eliminate the vibration during operation. Why the disturbance resistance factor of floating seats of the invention gets greater than 1 is that they have not had the disturbance picking-up area $A_u$ of the prior art which includes an unnecessary annular area $A_{ec}$ exposed in the cavity only picking up disturbance but not bearing any sealing load.

DETAILED DESCRIPTION OF THE INVENTION

FIGS. 7a and 7b show a mounted seat 02 designed with an equilateral triangle ABC as its section factor, whose ball-sealing surface is formed by rotating arc AB opposite to side AB of the section-designing triangle ABC, whose supported cylindrical surface is formed by rotating the projection CD of side CA, and whose sealing end surface should have been formed by rotating the projection CF' of side BC, but is actually the surface formed by rotating the intentionally extended projection CF of side BC to satisfy the special need of the upstream seat at the moment the valve is opening; the point F is the projection of the extension point E of side AB; if the side AB is not extended, the valve seat 02, as shown in FIG. 4a (the enlargement of the local view Y' in FIG. 3), will have no extended segment BE as in FIG. 4b which can press the seat end tight on the valve body 01 by medium pressure thereon at the moment the valve is opening and may be pressed into the through hole of the ball by the medium on the seat end to cause a damage; if the side AB is extended, the valve seat 02, as shown in FIG. 4b (the enlargement of the local view Y' in FIG. 3), will have an extended segment BE which can press the seat end tight on the valve body 01 by medium pressure thereon at the moment the valve is opening only to result in the medium flowing into the cavity through the gap near the point B; accordingly, the extended segment BE can be called a pressure relaying surface of the valve seat. As shown in FIG. 4, adding a venting groove on the ball 03 near the ball's small circle on the ball end face (near point B) can result in the medium venting to the cavity and pressing the seat end tight on the valve body before the valve is fully opening, and even can avoid using the pressure relaying surface BE. The ball-sealing chord AB of the seat 02 is at a 45 degree angle to the axis of the central bore of the ball, and the ball-sealing surface of the seat may be premanufactured into a 90° conical surface with side AB as its generatrix and then naturally forms a sealing sphere during assembly and service; the compression allowance of the seat during assembly can also be adjusted by slightly increasing the side length of its section-designing equilateral triangle ABC based on keeping its outside diameter constant. To prevent the seat in its being opening situation from washing away from the valve body to be pressed into the through hole of the ball by the medium, the valve seat should be provided with an inside diameter greater than that of the flow passage, namely segment EF should not be beyond segment GH in FIG. 7, and with an addition thickness for low strength material by suitably parallel moving its sealing end surface or by suitably parallel moving the surface forming side CF to the position of the dashed line in FIG. 7b. Adding a pressure relaying surface to the seat or adding the extension segment BE to AB will increase the disturbance picking-up area $A_{ep}$ of the seat and decrease the inside diameter of the seat but hardly influence the sealing performance or the sealing maintaining factor of the seat because the related variations are too limited, while adding a thickness to the seat does not yet change the sealing performance or the sealing maintaining factor of the seat, and therefore, though influencing the equilateral characteristic of seat-designing triangles, adding the pressure relaying surface and the thickness to the seat not only does not change the seat characteristics determined by the original equilateral triangle but also improves the seat processing, mounting and maintaining abilities.

FIG. 7c shows a mounted hard seat 02 designed with an equilateral triangle ABC as its section factor, whose material strength is high and whose original designing dimensions are the same as the ones of the seat shown in FIG. 7b made of low strength material and having no additional thickness. To endow the seat made of high strength material, such as polyparaphenylene (PPP) or metal, with a certain elastic deformation and assembling compression allowance, its original supported cylindrical surface CD needs to be cut short to qD or partially small from Cq to ms (or its original sealing end surface CF needs to be cut short to mF or partially low from Cm to qs) to make its original cylindrical surface become a stepped cylindrical outside surface and the intersection circle s of the newly-developed cylindrical surface ms and end surface qs be away from the vertex C of the triangle ABC along its altitude passing through the vertex C as the cutting develops, and an annular groove k, if necessary, also needs to be cut out whose bottom surface is tangent to the intersection circle and parallel to the ball-sealing cone AB. There are two sawtooth rings a' and b' in the ball-sealing cone AB formed by cutting out another cut of conical surfaces a"b" symmetrically arranged about the side AB and parallel to the original ball-sealing cone AB and having a radial distance $Z_t$ away from the on-off ball (03) surface passing through the vertexes a' and b' of the sawtooth rings (see FIG. 7e), which means the height of the sawtooth rings is $Z_t$ relative to the on-off ball surface; the linear distance between the undercut conical surface a"b" and the ball-sealing cone AB is only the formal height of the sawtooth rings. There may be or may not be at least two sawtooth rings with the end outline edges m and F as their vertexes on the remaining end surface mF; if there is no sawtooth ring, there needs to be a soft gasket whose configuration and volume are equivalent to the cut out part Cmsq; if there are more than two sawtooth rings, their shapes are the same as the ones of those two sawtooth rings m and F and their vertexes are all on the remaining end surface mF. As shown in FIGS. 7c, 7d and 7e, the crests of the sealing end sawtooth rings m and F and the ball-sealing sawtooth rings a' and b' are a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) surface protecting the line contact thereon from for ever disappearing so that it can be easy to realize the sealing of the precision machined surface without lapping. The amount of the cut out part Cmsq of the seat is determined by the allowable strength capacity of its sealing end surface and its cylindrical supported surface, the width k of the annular groove is determined by its required elasticity, and the value of k often equals zero. A suitable elasticity and an appropriate fit clearance between its cylindrical supported surface and its corresponding valve body can result in a certain bending of its section to prevent the radial sliding of its sealing end surface. The rear-cutting-out of the seat is equivalent to decreasing the outside diameter $D_o$ of the seat and increasing the disturbance resistance factor m of the seat.

FIGS. 8a and 8b show a mounted seat 02 designed with an equilateral triangle ABC as its section constituent, whose ball-sealing surface is formed by rotating arc AB opposite to side AB of the section-designing triangle ABC, whose sealing end surface is formed by rotating side BC, and whose supported cylindrical surface is formed by rotating the projection CD of side CA; whose ball-sealing chord AB is at a 45 degree angle to the axis of the central bore of the ball, and whose ball-sealing surface may be premanufactured into a 90° conical surface with side AB as its generatrix and then naturally forms a sealing sphere during assembly and service; whose compression allowance for its assembly can also be adjusted by slightly increasing the side length of its section-designing equilateral triangle ABC based on keeping its outside diameter constant.

FIG. 8c shows a mounted hard seat 02 designed with an equilateral triangle ABC as its section constituent, whose material strength is high and whose original designing dimensions are the same as the ones of the seat shown in FIG. 8b made of low strength material. To endow the seat made of high strength material, such as polyparaphenylene (PPP) or metal, with a certain elastic deformation and assembling compression allowance, its original supported cylindrical surface CD needs to be cut short to qD or partially small from Cq to ns (or its original sealing end surface CB needs to be cut short or partially low from Cm to qs) to make its original cylindrical surface become a stepped cylindrical outside surface and the intersection circle s of the newly-developed cylindrical surface ns and end surface qs be away from the vertex C of the triangle ABC along its altitude passing through the vertex C as the cutting develops, and an annular groove k, if necessary, also needs to be cut out whose bottom surface is tangent to the intersection circle and parallel to the ball-sealing cone AB. There are two sawtooth rings a' and b' in the ball-sealing cone AB formed by cutting out another cut of conical surface a"b" symmetrically arranged about the side AB and parallel to the original ball-sealing cone AB and having a radial distance $Z_t$ away from the on-off ball (03) surface passing through the vertexes a' and b' of the sawtooth rings (see FIG. 7e), which means the height of the sawtooth rings is $Z_t$ relative to the on-off ball surface; the linear distance between the undercut conical surface a"b" and the ball-sealing cone AB is only the formal height of the sawtooth rings. There may be or may not be at least two sawtooth rings with the end outline edges as their vertexes on the remaining end surface; if there is no sawtooth ring, there needs to be a soft gasket whose configuration and volume are equivalent to the cut out part Cmsq; if there are more than two sawtooth rings, their shapes are the same as the ones of those two sawtooth rings and their vertexes are all on the remaining end surface. As shown in FIGS. 8c, 7d and 7e, the crests of the sealing end sawtooth rings m and F and the ball-sealing sawtooth rings a' and b' are a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) surface protecting the line contact thereon from for ever disappearing so that it can be easy to realize the sealing of the precision machined surface without lapping. The amount of the cut out part Cmsq of the seat is determined by the allowable strength capacity of its sealing end surface and its cylindrical supported surface, the width k of the annular groove is determined by its required elasticity, and the value of k often equals zero. A suitable elasticity and an appropriate fit clearance between its cylindrical supported surface and its corresponding valve body can result in a certain bending of its section to prevent the radial sliding of its sealing end surface. The rear-cutting-out of the seat is equivalent to decreasing the outside diameter $D_o$ of the seat and increasing the disturbance resistance factor m of the seat.

FIGS. 9a~9d show a mounted seat 02 designed with an equilateral triangle ABC as its section outline and composed of an inner sealing ring (inner ring) 02a and an outer supporting ring (outer ring) 02b. The inner ring is using the equilateral triangle ABC as its section outline; the surface formed by rotating arc AB opposite to side AB is the ball-sealing surface of the seat, the surface formed by rotating side BC is the sealing end surface of the seat, and the surface formed by rotating side CA is the supported surface of the inner ring. The outer ring is of a trapezoid section, whose height side D'E' is the generatrix forming the cylindrical surface of the seat which is clear of its accommodating bore DE in the valve body, and whose oblique side AC' is the generatrix of the supporting conical surface for the inner ring. The inner ring is responsible for sealing, and the outer ring, for supporting the inner ring; and hence the outer ring is made of higher strength material than the inner ring. The material strength of the inner ring is determined by its ball's thrust load, and the material strength and the average wall thickness of the outer ring are designed according to a pipe bearing the medium pressure equivalent to the material's ultimate allowable strength of the inner ring. The fit clearance between the outer ring and its accommodating bore in valve body is at first to make its internal end and its external end be vented to each other or be at an equalized pressure to reduce the exposure influence of the seat in the body cavity, and then to enable the outer ring and the inner ring to slide freely on or relative to each other and to be mutually pressed tight and supported. The ball-sealing chord AB is at a 45 degree angle to the axis of the central bore of the ball, and the ball-sealing surface may be premanufactured into a 90° conical surface with side AB as its generatrix and then naturally forms a sealing sphere during assembly and service; the compression allowance during assembly can also be adjusted by slightly increasing the side length of the section-designing equilateral triangle ABC based on keeping a constant outside edge diameter of the inner ring. The ball 03 under fluid pressure presses at the same time the outer ring and the inner ring mutually supported to make both be initiatively pressed to protect each other from being pressed; i.e. the thrust of medium on the ball is borne jointly by the inner ring and the outer ring and is $(\lambda D_s^2 p/4=)$ $F_s = F \cos \alpha + F \sin \beta$ (where $F \cos \alpha$ is the axial component on the inner ring, $F \sin \beta$ is the axial component on the outer ring, F is the normal force on each inner ring surface, $\alpha$ is 45°, $\beta$ is 15°, p is the medium pressure, and $D_s$ is the actuating diameter of the ball on the seat). Since the total normal force on the joint ball-supporting surface of the inner and outer rings is $F_s/\cos \alpha$ and the radial or normal force on the surface of the inner ring is only F, the ratio of the bearing capacity of the sealing material used for the double ring seat to that used for the single ring seat is $(F_s/\cos \alpha)/F = 1 + \sin \beta/\cos \alpha = 1.366$, which actually is because that the inner ring of the invention is using two surfaces to bear the thrust of medium on balls and the single ring seat is using one surface. In addition, the inner ring is almost enclosed for being compressed and, like the oil in a hydraulic cylinder, has no compressive deformation, no extrusive deformation or rupture and nowhere to creep and hence can have an actual bearing strength far higher than its material allowable strength. Therefore, the assembled seat of the invention can ensure that the soft material with excellent sealing property is used for a higher pressure limit of valves and has a longer lifetime and a higher reliability.

FIG. 9e shows an inner ring 02a of the mounted hard seat designed with an equilateral triangle ABC as its section outline and substituted for the inner ring 02a in FIG. 9a, whose material strength is high and whose original designing dimensions are the same as the ones of the inner ring shown in FIG. 9c made of soft material. To endow the inner ring made of high strength material, such as polyparaphenylene (PPP) or metal, with a certain elastic deformation and assembling compression allowance, its original supported surface CA needs to be cut short to qA or partially small to form a new cylindrical surface ns (or its original sealing end surface CB needs to be cut short or partially low to form a new end surface qs) to make the intersection circle s of the newly-developed cylindrical surface ns and end surface qs be away from the vertex C of the triangle ABC along its altitude passing through the vertex C as the cutting develops, and an annular groove k, if necessary, also needs to be cut out whose bottom surface is tangent to the intersection circle and parallel to the ball-sealing cone AB. There are two sawtooth rings a' and b' in the ball-sealing cone AB formed by cutting out another cut of conical surface a"b" symmetrically arranged about the side AB and parallel to the original ball-sealing cone AB and having a radial distance $Z_t$ away from the on-off ball (03) surface passing through the vertexes a' and b' of the sawtooth rings (see FIG. 7e), which means the height of the sawtooth rings is $Z_t$ relative to the on-off ball surface; the linear distance between the undercut conical surface a"b" and the ball-sealing cone AB is only the formal height of the sawtooth rings. There may be or may not be at least two sawtooth rings with the end outline edges as their vertexes on the remaining end surface; if there is no sawtooth ring, there needs to be a soft gasket whose configuration and volume are equivalent to the cut out part Cmsq; if there are more than two sawtooth rings, their shapes are the same as the ones of those two sawtooth rings and their vertexes are all on the remaining end surface. As shown in FIGS. 9e, 7d and 7e, the crests of the sealing end sawtooth rings m and F and the ball-sealing sawtooth rings a' and b' are a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) surface protecting the line contact thereon from for ever disappearing so that it can be easy to realize the sealing of the precision machined surface without lapping. The amount of the cut out part Cmsq is determined by the allowable strength capacity of the sealing end surface and the supported surface, the width k of the annular groove is determined by the required elasticity, and the value of k often equals zero. The rear-cutting-out of the inner ring is equivalent to decreasing the outside diameter $D_o$ of the seat and increasing the disturbance resistance factor m of the seat.

FIGS. 11a~11g show a floating seat 02 designed with an equilateral triangle ABC as its section outline and composed of a sealing ring 02a, a supporting ring 02b, a clamping ring 02c, a sealing ring 02d and a preloading spring 02e. The sealing ring is using the equilateral triangle ABC as its section outline; the surface formed by rotating arc AB opposite to side AB is the ball-sealing surface of the seat, the surface formed by rotating side BC is the clamped surface of the sealing ring, and the surface formed by rotating side CA is the supported surface of the sealing ring. The supporting ring is responsible for providing a sealing support for the supported surface after completing the fastening and sealing connection with the valve end cover 05a by a thread engagement and the sealing gasket, the preloading spring provides an initial seating stress for the sealing ring by the clamping ring, and a medium pressure provides a sealing stress for the sealing ring by the clamping ring or not by. The medium pressure can only indirectly press the sealing ring through the clamping ring if there is a tight engagement between the clamped surface and the clamping surface, and if not therebetween, the medium can freely enter the contact surface and directly press the sealing ring. It has a higher sealing efficiency, without friction loss, for medium to directly press on the sealing ring. The sealing ring is responsible for sealing and made of low strength material, whose material strength is determined by its ball-sealing load. The ball-sealing chord AB is at a 45 degree angle to the axis of the central bore of the ball, and the ball-sealing surface may be premanufactured into a 90° conical surface with side AB as its generatrix and then naturally forms a sealing sphere during assembly and service; the compression allowance during assembly can also be adjusted by slightly increasing the side length of the section-designing equilateral triangle ABC based on keeping a constant outside edge diameter of the sealing ring. Besides, there is a spanner hole on the end face of the supporting ring.

Figure 11G:
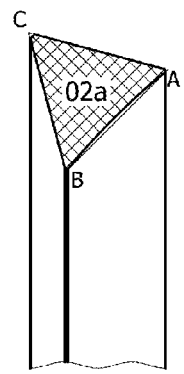

FIG. 11h shows a sealing ring 02a of the floating hard seat designed with an equilateral triangle ABC as its section outline and substituted for the sealing ring 02a in FIG. 11a, whose material strength is high and whose original designing dimensions are the same as the ones of the sealing ring shown in FIG. 11g made of soft material. To endow the sealing ring made of high strength material, such as polyparaphenylene (PPP) or metal, with a certain elastic deformation and assembling compression allowance, its original supported surface CA needs to be cut short to mA or partially small to form a new cylindrical surface qs (or its original clamped surface CB needs to be cut short or partially low to form a new end surface ns) to make the intersection circle s of the newly-developed cylindrical surface qs and end surface ns be away from the vertex C of the triangle ABC along its altitude passing through the vertex C as the cutting develops, and an annular groove k, if necessary, also needs to be cut out whose bottom surface is tangent to the intersection circle and parallel to the ball-sealing cone AB. There are two sawtooth rings a' and b' in the ball-sealing cone AB formed by cutting out another cut of conical surface a"b" symmetrically arranged about the side AB and parallel to the original ball-sealing cone AB and having a radial distance $Z_t$ away from the on-off ball (03) surface passing through the vertexes a' and b' of the sawtooth rings (see FIG. 7e), which means the height of the sawtooth rings is $Z_t$ relative to the on-off ball surface; the linear distance between the undercut conical surface a"b" and the ball-sealing cone AB is only the formal height of the sawtooth rings. There may be or may not be at least two sawtooth rings with the end outline edges as their vertexes on the remaining supported surface; if there is no sawtooth ring, there needs to be a soft gasket whose configuration and volume are equivalent to the cut out part Cmsq; if there are more than two sawtooth rings, their shapes are the same as the ones of those two sawtooth rings and their vertexes are all on the remaining supported surface. As shown in FIGS. 11h, 7d and 7e, the crests of the sealing supported sawtooth rings m and F and the ball-sealing sawtooth rings a' and b' are a cutting edge whose corner or whose crest angle is about 90°~120°, the tooth height $Z_t$ is about 10~20 times the roughness $R_a$ of the seated surface, and the ratio of the tooth pitch $X_s$ to the tooth height $Z_t$ equals 20~500 (corresponding to the ratio of the width $X_s$ to the height $Z_t$ of profile elements between the surface roughness with wider profile elements and the surface waviness with narrower profile elements), thus ensuring that a deforming sealing edge is followed by a smooth (conical or spherical) surface protecting the line contact thereon from for ever disappearing so that it can be easy to realize the sealing of the precision machined surface without lapping. The amount of the cut out part Cmsq of the sealing ring is determined by the allowable strength capacity of its supported surface and its clamped surface, the width k of the annular groove is determined by its required elasticity, and the value of k often equals zero. A suitable elasticity for the sealing ring can result in a certain bending of its section to compensate for its floatability. The rear-cutting-out of the sealing ring is equivalent to decreasing its outside diameter $D_o$ and its sealing actuation area of medium or reducing the disturbance resistance factor m of the seat, but the factor m is always greater than 1 because the circular radius of the cut point m is always greater than that of the point A.

As a whole, all the ball valve seats, whether of mounted type or floating type, whether of metal or of non-metal and whatever shapes their section is, can be designed with a section-designing equilateral triangle and with their section as unexposed and as approximate to an equilateral triangle whose side is the ball sealing chord as possible.

An Example for Designing a Section-Designing Equilateral Triangle ABC of Ball Valve Seats Whose Disturbance Resistance Factor m=2 and DN=25 (See FIG. 6):

1. Given the bore $D_n$(=25 mm) of the ball, determine the diameter d' [=1.04$D_n$(=26 mm)] of the ball's small circle on the ball end face.

The bore of the ball is specified in standards; for example, the central bore $D_n$ of DN 25 balls shall be 25 mm. The entrance strength of the ball is directly proportional to the ratio of "wall thickness/bore" of the ball at its entrance and then based on practices, uniformly letting "wall thickness/bore"=0.02 comes to the ball's small circle diameter d' (=1.04$D_n$=26 mm) on the ball end face.

2. Based on d' (=26 mm), determine the diameter d [=d'/sin 38°(=42 mm)] of the ball.

As shown in FIG. 6a, given the diameter d' (=26 mm) of the ball's small circle and then the angle $\alpha_0$, it is possible to determine in turn the diameter d (=d'/sin $\alpha_0$) of the ball, the section-designing equilateral triangle ABC of the seat and its disturbance resistance factor m; to determine the angle $\alpha_0$ is actually to determine the factor m, for the angle $\alpha_0$ is exactly corresponding to the factor m and the opposite rounding of their relative calculated values can compensate for their mutual correspondence. Both practical and theoretical calculations prove that m=2 corresponds to $\alpha_0$=38°, m=1.8 to $\alpha_0$=37°, and m=1.5 to $\alpha_0$=35.5°, when letting the side length a of the equilateral triangle ABC be equal to 0.9a'. (a=0.9a'.). Therefore, m=2 corresponds to d=26/sin 38°=42 mm (reduced by 0.23), a'=4.94 mm and a=4.5 mm (increased by 0.054); m=1.8 to d=26/sin 37°=43 mm (reduced by 0.2), a'=5.83 mm and a=5.3 mm (increased by 0.053); and m=1.5 to d=26/sin 35.5°=45 mm (increased by 0.23), a'=7.59 mm and a=6.8 mm (reduced by 0.031).

3. Based on d' (=26 mm) and d=(=42 mm), draw the datum segment A'B' of the equilateral triangle ABC with AutoCAD.

As shown in FIG. 6a, the ball-sealing chord AB should be symmetrically arranged within the datum segment A'B' demarcated by the projection line and the tangent B"A' of the ball's small circle d' on the ball end face in the two positions of the ball rotated for 90° in order to enable the sealing arc (surface) to fully press on the ball surface and keep its sealing readiness when the valve is fully opened or closed; letting the end A of the ball-sealing chord AB be beyond the tangent B"A' of the circle d', the end face of the ball in the fully closed position (as shown by dashed lines in FIG. 2b) will rest on and be seated in the ball-sealing surface and cause the seat to be deformed or damaged; letting the end B of the ball-sealing chord AB be beyond the ball end face will cause the seat a reduced inside diameter or cause the upstream seat to wash away or to be extruded, or cause the seat an increased ball-covered area $A_{ep}$ or cause the downstream seat to have a reduced disturbance resistance (as shown in FIG. 5b); i.e. datum segment A'B' of the equilateral triangle ABC is determined by the ball diameter d and the ball's small circle d' on the ball end face, and can be simply obtained by CAD drawing. Because the following and the final needs are all to draw the triangle ABC based on the line segment A'B', it is unnecessary to sink an A'B'—calculating formula by complicated derivation. Because there is always an equation of B"O'=B"O=r' independent of the magnitude of the ball diameter d and the ball's small circle diameter d', the ball-sealing chord AB of the seat-designing triangle ABC is at a 45 degree angle to the bore centerline of the ball.
4. Based on the segment A'B', define the side AB of the equilateral triangle ABC by AutoCAD drawing.
   To ensure the side length $a^{\pm\delta}$ of the equilateral triangle ABC to be symmetrically within the segment A'B' (a'), at first draw the side AB of the triangle ABC symmetrically on the segment A'B' to the length a=0.9a' (=4.5 mm) and then parallel move the side AB to be a chord of the circle d keeping symmetric to A'B'.
5. Draw the section-designing equilateral triangle ABC by AutoCAD and verify if m $[=D_s^2/(D_o^2-D_i^2)]$ equals 2 using the diameters ($D_s$, $D_i$ and $D_o$) given by vertexes A, B and C.
   If m>2, slightly increase the side length a of the triangle ABC; if m<2, slightly decrease the side length a of the triangle ABC. In order to ensure that m approximates to 2 for once, it needs to pay attention to oppositely rounding the calculated data: if the rounding of d=d'/sin 38° is decreased, the rounding of a=0.9a' should be increased properly, and vice versa.

Based on the definition $m=A_s/(A_e+A_c)$ [the disturbance resistance factor (m) of mounted seats=actuating areas of medium on balls ($A_s$)/actuating areas of medium on seats ($A_e+A_c$)] (see FIG. 9), the following equations can be got: $A_s=m(A_e+A_c)$, and $A_s p=mp(A_e+A_c)$. Practical calculation shows that $A_e+A_c \approx A_c/\cos 45° = \sqrt{2}A_c$. Accordingly, $A_s p \approx \sqrt{2}mpA_c$, i.e. the load ($A_s p$) on mounted seats=the material allowable strength ($\sqrt{2}mp$) times the stress area ($A_c$) of mounted seats or $\sigma \approx \sqrt{2}mp$.

Based on that the seat's normal load $F_s/\cos \alpha [=(\pi D_s^2 p/4 \cos \alpha)]$ from medium (pressure p) through balls is equal to the allowable load ($\pi D_a a \sigma$) of seats, or based on the equation (see FIG. 6):

$$\frac{\pi D_s^2 p}{4\cos\alpha} = \pi D_a a \sigma$$

the material allowable strength ($\sigma$) of mounted seats can be exactly got:

$$\sigma = \frac{D_s^2 p}{4\cos\alpha D_a a}$$

-continued $$= \frac{D_s^2 p}{4\cos\alpha[(D_s + D_i)/2][(D_s - D_i)/(2\cos\alpha)]}$$

$$= \frac{D_s^2 p}{(D_s + D_i)(D_s - D_i)}$$

$$= \frac{p}{1 - D_i^2/D_s^2}$$

$$= kp$$

while practical calculation proves that $k=1/(1-D_i^2/D_s^2) \approx \sqrt{2}m$.

Therefore, both calculating methods has proved that the allowable strength ($\sigma$) of the mounted seat designed with the equilateral triangle of the invention can be determined simply according to $\sigma=\sqrt{2}mp$, where m is the sealing maintaining factor m and p the ultimate medium pressure.

Practical designs illustrate that a smaller disturbance resistance factor m of the mounted seat for floating ball valves, besides increasing the applicable pressure rating of low strength seat materials, would cause a larger size of balls, seats, valve bodies, operation torques and so a very uneconomic design when m<1.5, for the seat-designing method according to equilateral triangle sections is on the premise of avoiding the unnecessary seat exposures to the maximum extent possible. Testings demonstrate that a floating ball valve can still keep its tight closure by the floating of its ball when the m of its single ring seat equals 1.8, and be used enough for a pressure rating of 15 Mpa when the m of its PTFE's double ring seat equals 2. Therefore, the mounted seat for floating ball valves is both economic and reliable with its disturbance resistance factor m equal to 2. Because the load of floating seats is always less than that of mounted seats at an identical level of sizes and ratings, the floating seat can be designed with the section-designing equilateral triangle for designing the corresponding mounted seat; nevertheless the sealing ring for mounted seats has a disturbance resistance factor m equal to 2, and for floating seats, only an m equal to $\sqrt{2}$ but is still greater than 1 as needed.

The above-disclosed ball valve seats are of what does not need exposure and needs to eliminate exposure to the maximum extent possible, while the following disclosure is especially of the seat for seat-mounted ball valves that needs a certain exposure, which is understandable and distinguishable.

A mounted ball valve is the ball valve whose ball is mounted in the valve body only to be turnable but not floatable and called the trunnion-mounted ball valve in the prior art because its ball is mounted by two coaxial trunnions including one used as the valve stem. A double block and bleed valve (DBB valve) is the valve whose two seating surfaces, in the closed position, can block flow from both valve ends when the cavity between the seating surface is vented through a bleed connection provided on the body cavity for special injecting or sampling, and the DBB ball valves of the prior art are all of a big size of trunnion mounted ball valves. Since a formal floating ball valve, without sufficient disturbance resistance, can only provide the tight closure by the ball clamping force from its two mounted seats but not by the ball floating force from medium, it is obvious that the formal floating ball valve whose ball looks floatable only in design is actually a seat-mounted ball valve capably used as the double block and bleed valve (DBB valve), wherein the on-off ball of the said ball valve is mounted in a valve body not by trunnions but by seats, and hence formally looks floatable under medium pressure but actually is clamped in the said seats only to be turnable but not floatable within the whole working pressure range; the said seats have an increased annular area ($A_e$) exposed in the body cavity by increasing their outside diameter ($D_o$) to make their disturbance resistance factor (m) equal to $A_s/(A_e+A_c)$ and smaller than 1.33 (i.e. $m=A_s/(A_e+A_c)<1.33$) based on keeping fixed the actuating area ($A_s$) of medium on the said ball and the seat's annular area ($A_c$) covered by the said ball designed with equilateral triangle section methods (see FIGS. 7a and 8a). As shown in FIG. 5a, the closing or working condition for the seat-mounted ball valve is that $W_2$ (the ball clamping force from the seat)>$A_s$p (the thrust of medium on the ball)=$m(A_e+A_c)p$, and hence the seat can have a disturbance resistance factor of m [$1.33>m=A_s/(A_e+A_c)=1/(0.75\sim1)>1$] or its ball clamping force ($W_2$) has a pressure of mp ($1.33p>mp>1p$) which ensures that the seat both can pass the closure test of not less than 1.1 times the rated working pressure (p) and can prevent the pressure trapped in the cavity from exceeding 1.33 times the rated working pressure (p) when the seat has a fixed annular area of $A_c$ [$=A_s/(2\sqrt{2})=0.35A_s$] covered by the ball and an increased annular area of $A_e$ [$0.40A_s<A_e<0.65A_s$] exposed in the cavity by increasing the seat outside diameter $D_o$ based on the equilateral triangle section with m equal to 2. Therefore, the essence of increasing the seat's annular area ($A_e$) exposed in the cavity is decreasing the seat's disturbance resistance factor m and the magnitude differential between the pressure relieving power ($A_e+A_c$)p of the body cavity and the ball clamping force $m(A_e+A_c)$p from the seat to ensure that the pressure trapped in the body cavity does not exceed 1.33 times the rated working pressure, and also relatively reducing the ball floating force from medium and its impact on "double blocking" tightness at both sides of the ball. Because the ultimate operation torque of the seat-mounted ball valve of the invention is twice as much as that of the floating ball valve of the invention, the seat-mounted ball valve of the invention is only applicable for some small sizes of double block and bleed valves, which are just unavailable in the prior art, and have a simple design, a good reliability, a wide applicability, a low cost etc.

It needs to be particularly pointed out that the on-off ball relying on its floated pressure on its downstream seat for its tight closure can not automatically recover its intimate contact with its seat (can only float between its seats for ever) after separated from its seat under disturbance, while the on-off ball relying on its clamping force from mounted seats for its tight closure can recover its intimate contact with its seat by its other seat soon after disturbance disappears, and hence the former needs its seat to have a greater disturbance resistance factor than the latter; therefore, if to an identical closing extent, the seat for the seat-mounted ball valve may require a low value of sealing maintaining factor $m_2$ [$=W_2/(A_{e2}+A_c)$p, (ball clamping forces from seats)/(unsealing actuation forces on seats)], while the seat for the floating ball valve a high value of $m_s$ [$=W_s/(A_{es}+A_c)$p, (ball-floated sealing forces from medium)/(unsealing actuation forces on seats)]; i.e. a low value of sealing maintaining factor $m_2$ for the seat-mounted ball valve does not affect its closing reliability, and also reduces the magnitude differential between the pressure relieving power ($A_e+A_c$)p of its cavity and the ball clamping force $m(A_e+A_c)$p from its seats to more effectively ensure that its seat satisfies both the closing requirement and the cavity's pressure relieving requirement. It also needs to be further pointed out that the $W_2$ needed for the formal floating ball is almost equal to the $W_s$ needed for the real floating ball valve at an identical level of sizes and pressure ratings although $W_2$ is greater than $W_s$ in a formal floating ball valve and $W_2$ is smaller than $W_s$ in a real floating ball valve, for the $m_2$ is smaller than $m_s$ ($m_2<m_s$) but the $A_{e2}$ greater than $A_{es}$ ($A_{e2}>A_{es}$) and the ($A_{e2}+A_c$) greater than ($A_{es}+A_c$)[($A_{e2}+A_c$)>($A_{es}+A_c$)] in the equations $W_2=m_2(A_{e2}+A_c)$p and $W_s=m_s(A_{es}+A_c)$p; i.e. in brief and in general, the ball clamping force from seats for formal floating ball valves is larger than the ball-floated pressure on seats from medium for real floating ball valves, or rather the ball clamping force from seats for formal floating ball valves is not smaller than the ball-floated pressure on seats from medium for real floating ball valves at least and the ultimate operation torque of the formal floating ball valve of the prior art is undoubtedly at least twice as great as that of the real floating ball valve of the invention.

It can be said that the seat-mounted ball valve of the invention has illustrated that the floating ball valves of the prior art are often a formal floating ball valve whose ball looks floatable only in design. The seat-mounted ball valve has been very available, but has never been used as a DBB valve by providing a bleed connection for the cavity because the prior art has thought that the ball of floating ball valves in the closed position will more or less move along the axis of flow passages against its downstream seat for performing its sealing task thereat under pressure but never realized that the ball would be too clamped by its mounted seats to float, as described in U.S. Pat. No. 4,940,208 and U.S. Pat. No. 4,815,700.

From all the above-mentioned, it can be seen that all the valve seats for floating ball valves, trunnion-mounted ball valves and seat-mounted ball valves can be designed or developed with an equilateral triangle as their section factor or section constituent or section outline, and their essential performance can be controlled or measured by making the disturbance resistance factor m of their seat approximate to the factor m of their seat-designing datum equilateral triangle.

The invention claimed is:

1. A floating ball valve having a pair of mounted ball-seats designed with an equilateral triangle ABC as its section outline and composed of an inner sealing ring (inner ring) and an outer supporting ring (outer ring), wherein the inner ring is of using the equilateral triangle ABC as its section outline: side AB of the triangle ABC is the ball sealing chord of the seat and at a 45 degree angle to the axis of the central bore of the ball, the surface of revolution of side BC is the sealing end surface of the seat, and the surface of revolution of side CA is the supported surface of the inner ring; the outer ring is of a trapezoid section, whose height side D'E' is the generatrix of the cylindrical surface of the outer ring or the seat, between which and whose accommodating bore in the valve body is a clearance fit, and whose oblique side AC' is the generatrix of the conical surface for supporting the inner ring; the ball under fluid pressure presses at the same time the outer ring and the inner ring mutually supported to make the outer ring and the inner ring be initiatively pressed to protect each other from being more pressed; the outer ring is made of higher strength material than the inner ring.

* * * * *